United States Patent
Ootani et al.

(10) Patent No.: US 8,072,257 B2
(45) Date of Patent: Dec. 6, 2011

(54) CHARGE PUMP-TYPE VOLTAGE BOOSTER CIRCUIT AND SEMICONDUCTOR INTEGRATED CIRCUIT DEVICE

(75) Inventors: Keigo Ootani, Kanagawa (JP); Takashi Tahata, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 12/588,150

(22) Filed: Oct. 6, 2009

(65) Prior Publication Data

US 2010/0085111 A1 Apr. 8, 2010

(30) Foreign Application Priority Data

Oct. 7, 2008 (JP) .................................. 2008-260484

(51) Int. Cl.
*G05F 1/10* (2006.01)
(52) U.S. Cl. .......................................... 327/536; 363/60
(58) Field of Classification Search .................. 327/536; 363/59–60
See application file for complete search history.

(56) References Cited

U.S. PATENT DOCUMENTS

| | | | | |
|---|---|---|---|---|
| 6,160,723 | A * | 12/2000 | Liu ................... | 363/60 |
| 6,429,635 | B2 * | 8/2002 | Okubo .................. | 323/282 |
| 6,525,949 | B1 * | 2/2003 | Johnson et al. .......... | 363/60 |
| 6,535,052 | B2 * | 3/2003 | Myono ................... | 327/536 |
| 6,970,035 | B2 * | 11/2005 | Tanimoto ............... | 327/536 |
| 7,005,912 | B2 * | 2/2006 | Nonaka .................. | 327/536 |
| 7,023,260 | B2 * | 4/2006 | Thorp et al. ............ | 327/536 |
| 7,116,156 | B2 * | 10/2006 | Myono et al. ........... | 327/536 |
| 7,148,740 | B2 | 12/2006 | Kobayashi et al. | |
| 7,224,591 | B2 * | 5/2007 | Kaishita et al. ......... | 363/60 |
| 7,466,189 | B2 * | 12/2008 | Sohara et al. .......... | 327/536 |
| 7,768,341 | B2 * | 8/2010 | Namekawa et al. ...... | 327/536 |
| 2002/0130704 | A1 * | 9/2002 | Myono et al. .......... | 327/536 |
| 2009/0195298 | A1 * | 8/2009 | Nakai .................. | 327/536 |

FOREIGN PATENT DOCUMENTS

JP 2005-304126 10/2005

* cited by examiner

*Primary Examiner* — Thomas J Hiltunen
(74) *Attorney, Agent, or Firm* — McGinn IP Law Group, PLLC

(57) ABSTRACT

A booster circuit includes first and second transistors, a first capacitor, a first drive circuit, a second capacitor, a first controller, and a second controller. The first and second transistors are connected in series between a first voltage and a second voltage. One end of the first capacitor is connected to a connection node between the first transistor and the second transistor. The first drive circuit boosts the voltage at the other end of the first capacitor. The second capacitor is connected between the second voltage and a reference voltage. The first controller controls conduction/non-conduction of the first transistor. The second controller inputs any of the first voltage and the second voltage to the second transistor, and thereby controls conduction/non-conduction of the second transistor. The boost circuit is supplied with the reference voltage, a supply voltage, and a boost clock signal, and generates the second voltage by boosting the supply voltage.

10 Claims, 11 Drawing Sheets

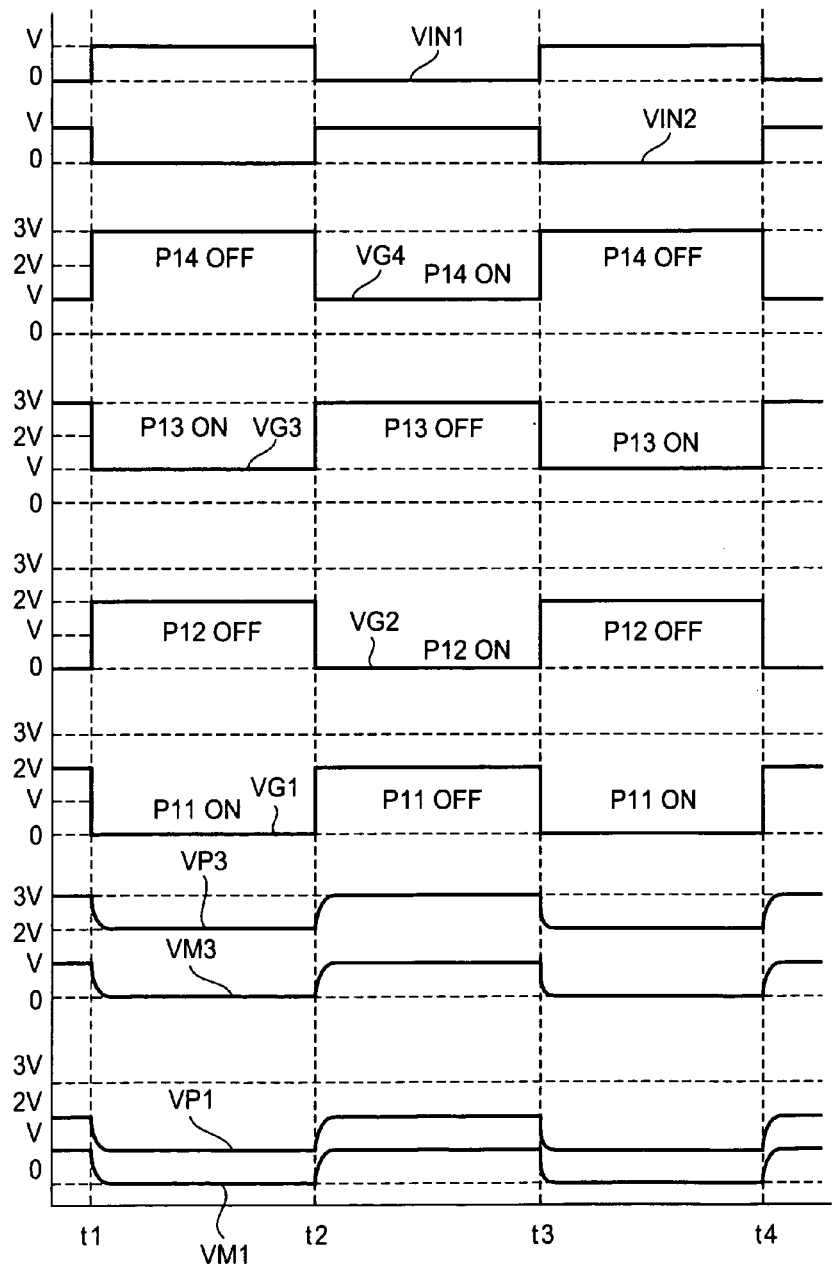

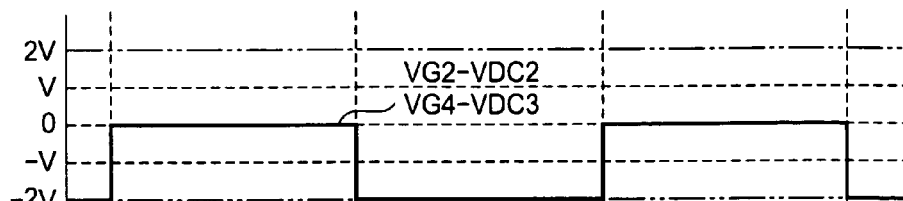
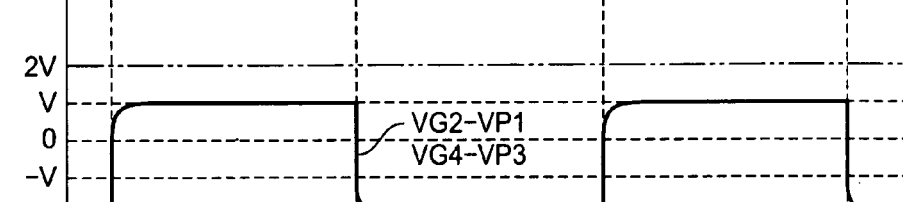
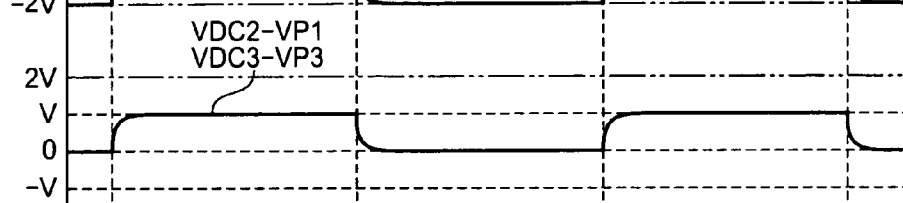
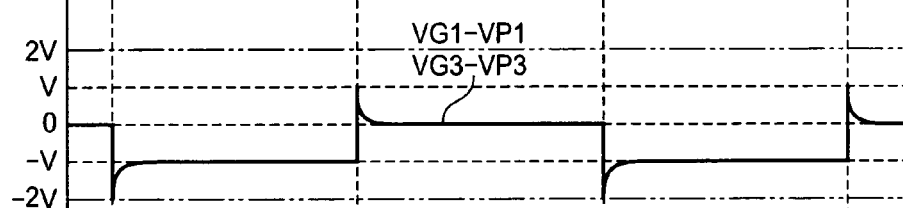
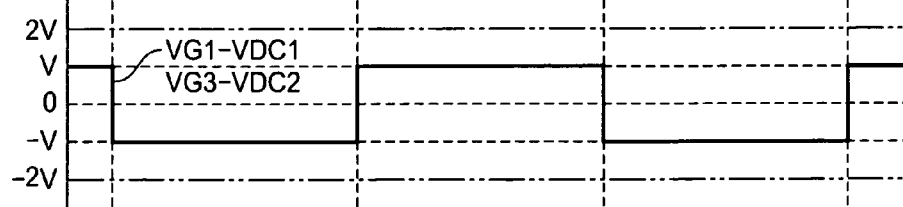
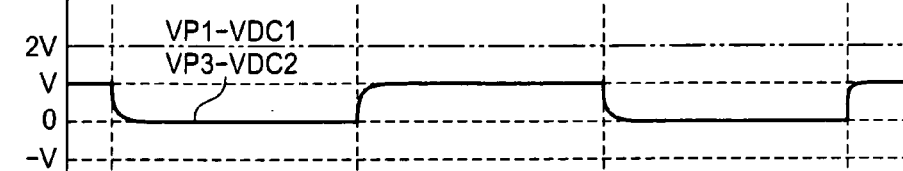

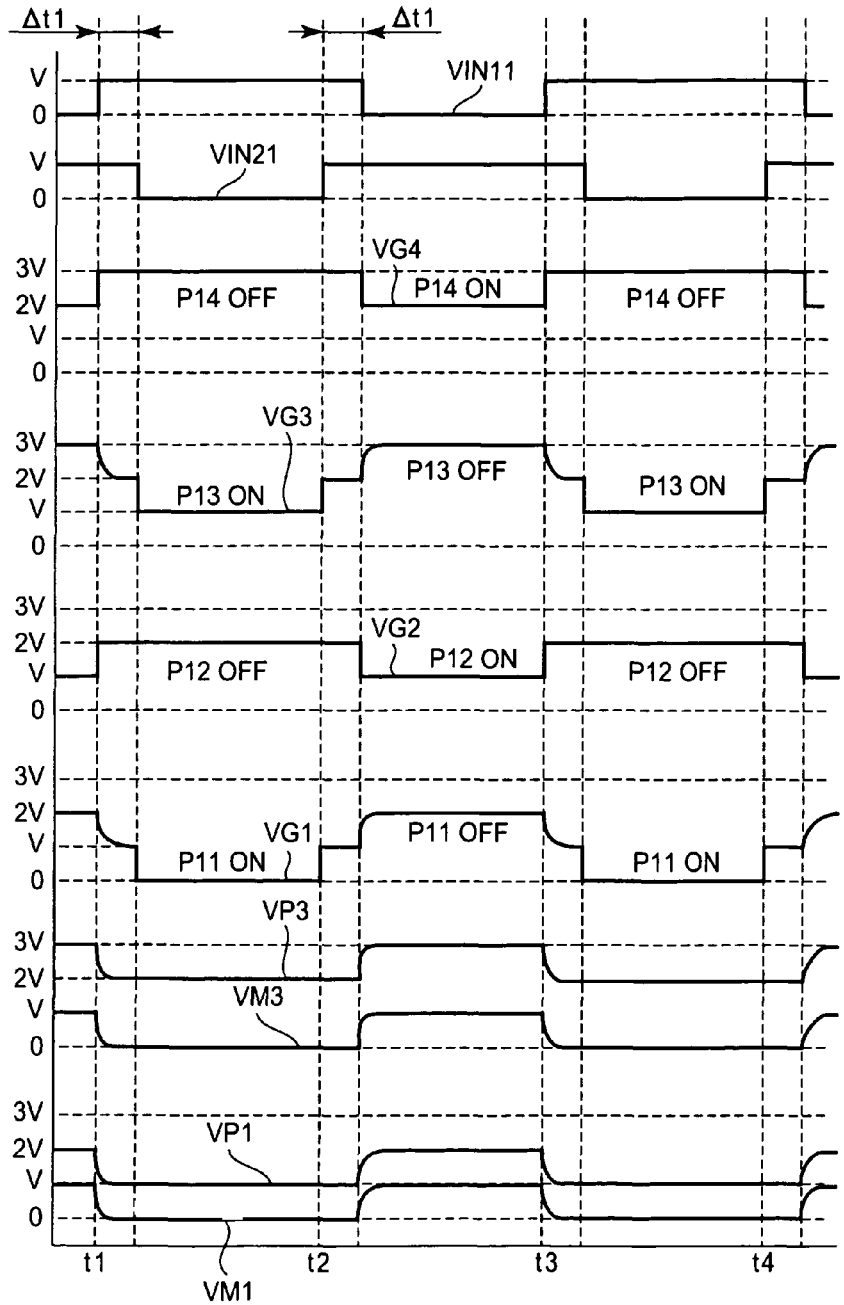

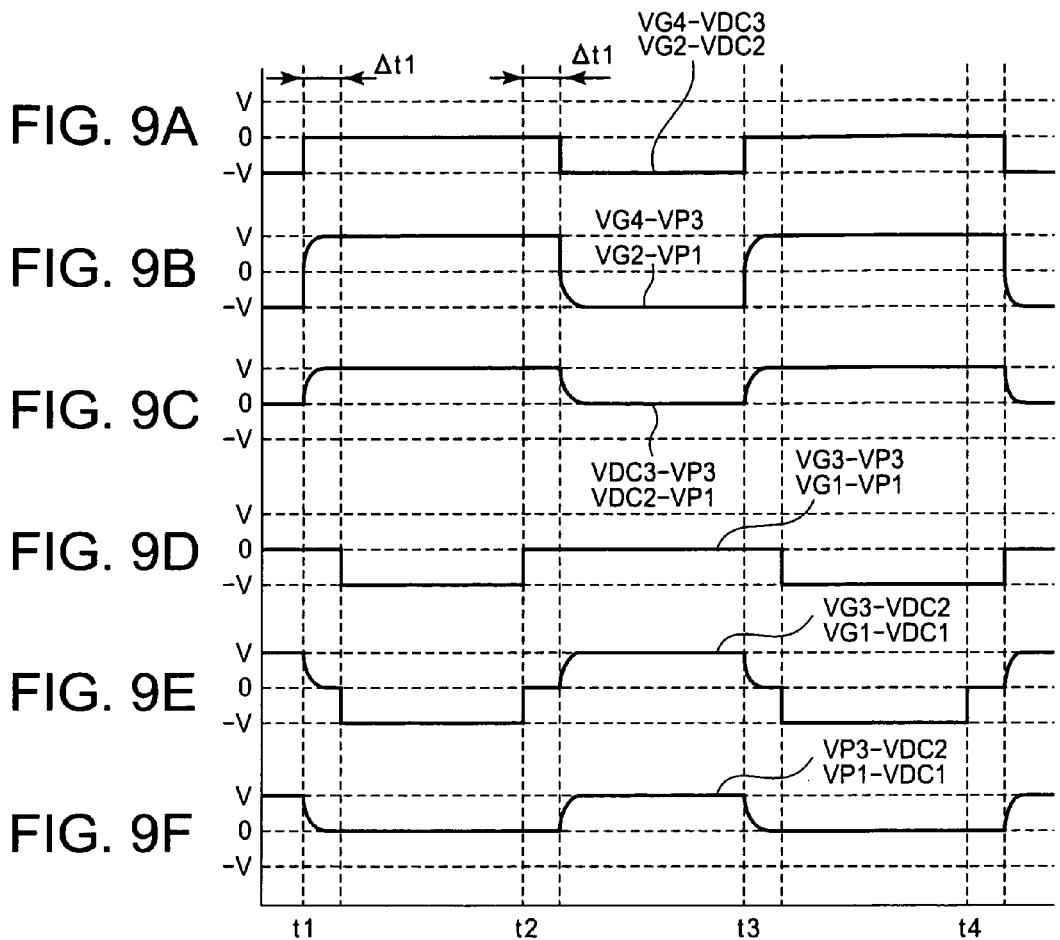
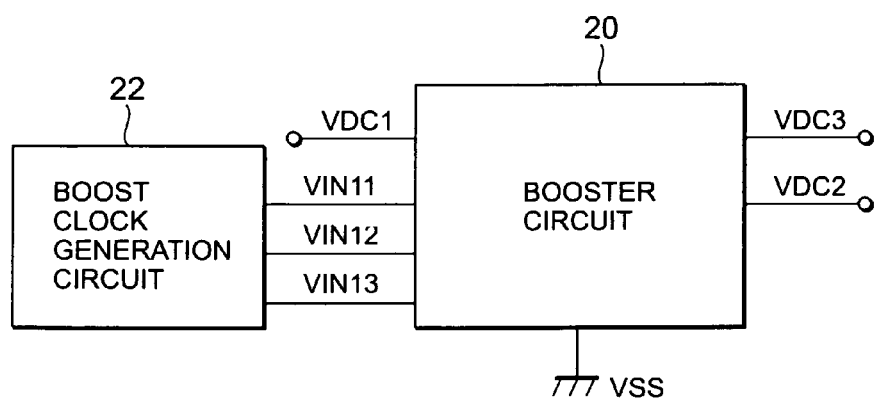

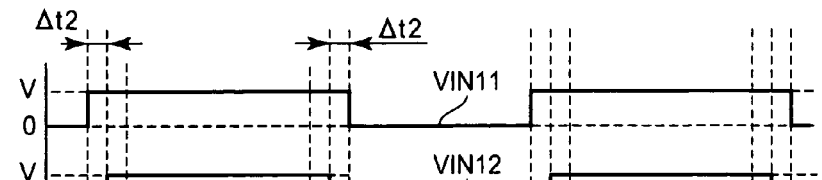
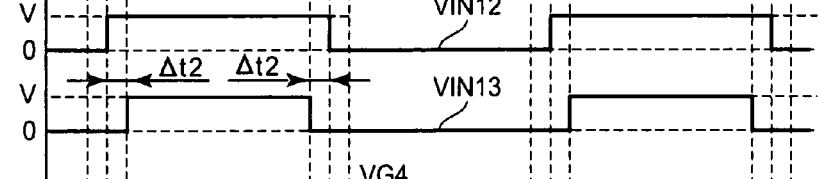
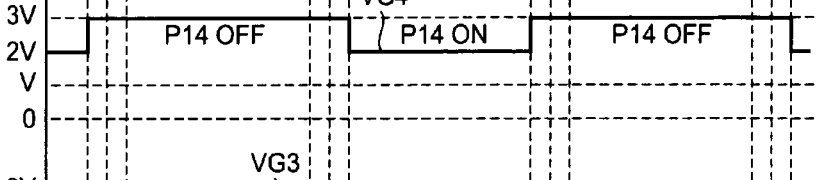
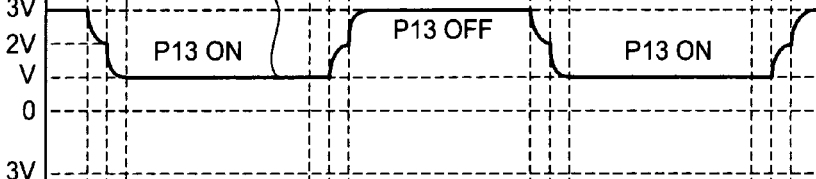
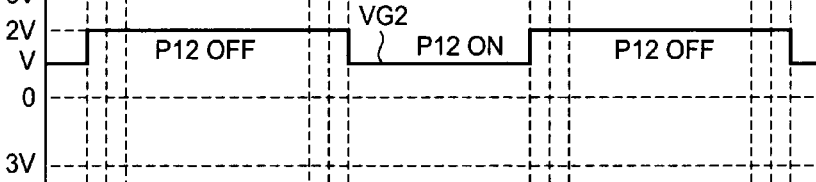
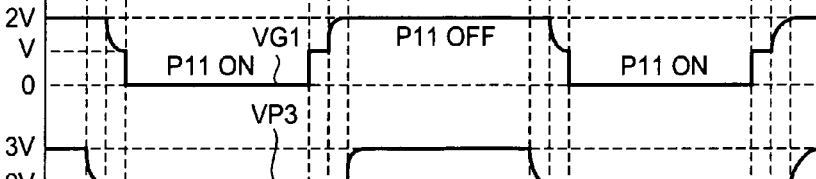
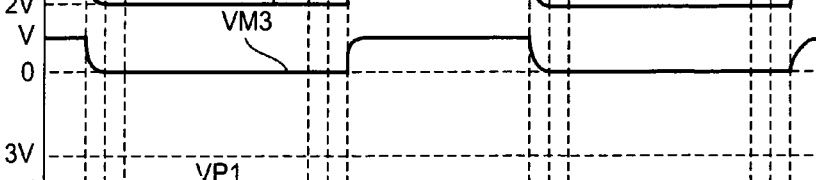
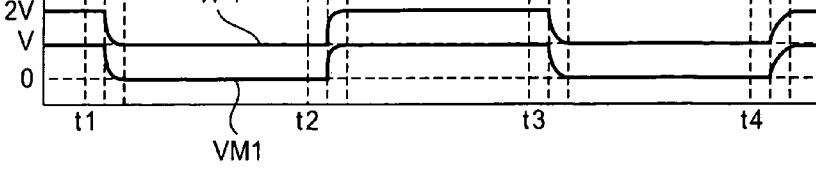
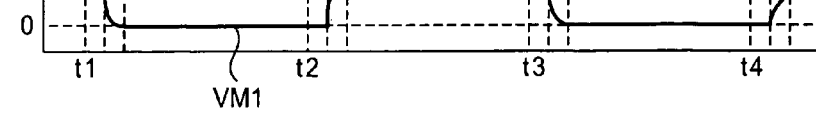

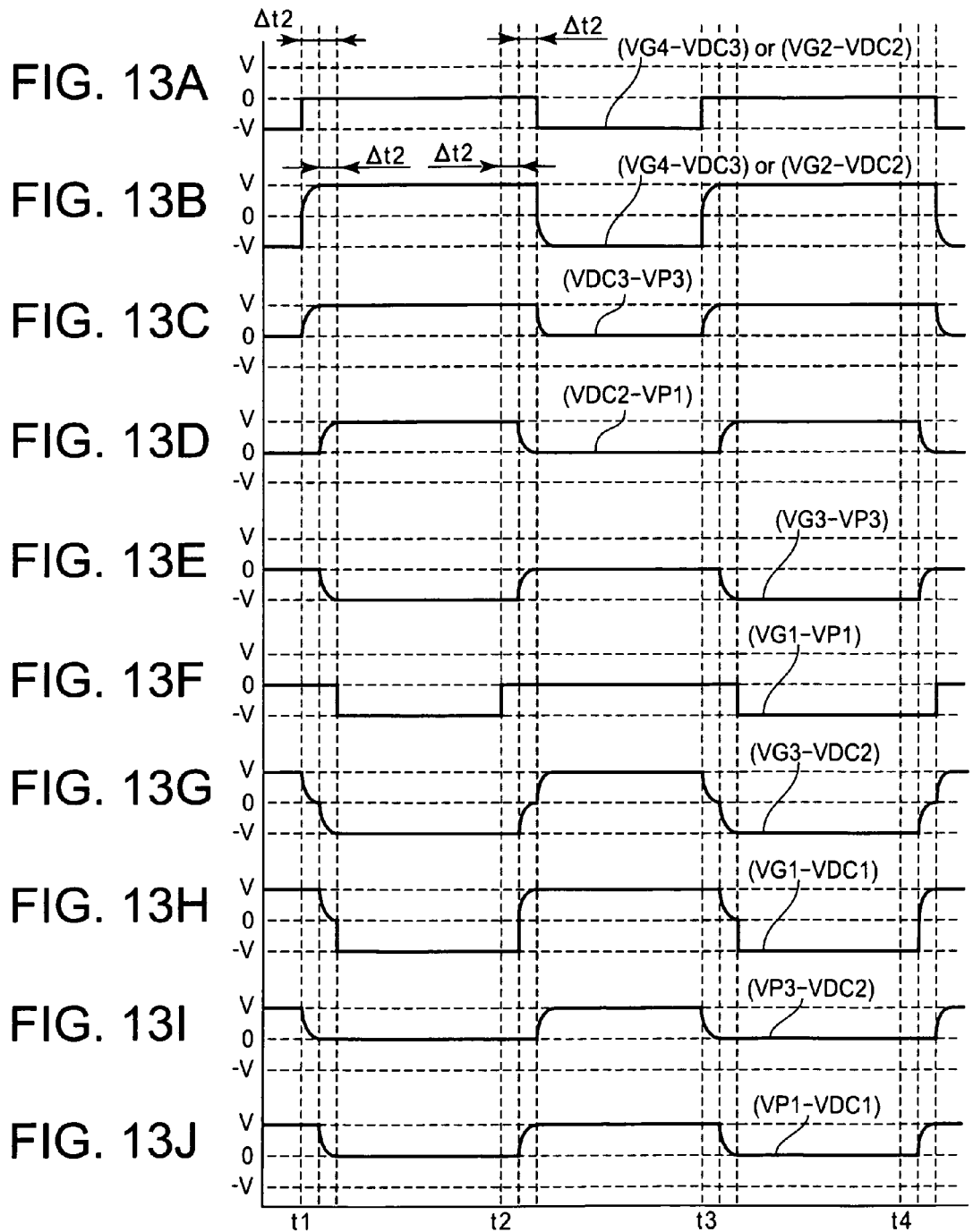

CHARGE PUMP-TYPE VOLTAGE BOOSTER CIRCUIT AND SEMICONDUCTOR INTEGRATED CIRCUIT DEVICE

INCORPORATION BY REFERENCE

This application is based upon and claims the benefit of priority from Japanese Patent Application No. 2008-260484 which was filed on Oct. 7, 2008, the disclosure of which is incorporated herein in its entirety by reference.

BACKGROUND OF THE INVENTION

1. Field of the Invention

The present invention relates to a booster circuit and a semiconductor integrated circuit device incorporating the booster circuit.

2. Description of Related Art

Along with the recent trend of using low-voltage power, voltage necessary for drive is now often generated by booster circuits. For example, what is sometimes used in a power circuit of a TFT (Thin Film Transistor) driver IC (Integrated Circuit) that drives liquid crystal displays is a booster circuit of a charge pump type using a MOSFET (Metal Oxide Semiconductor Field Effect Transistor). A supply voltage inputted into this booster circuit varies in magnitude depending on a configuration of an electrical power system that supplies a supply voltage to the driver IC. Therefore, different input power voltages may be supplied to the same driver IC. For this reason, a technique has been desired by which a substrate area of the booster circuit is reduced, while achieving efficient boosting and outputting of a wide range of the input power voltages.

Such a booster circuit has been disclosed in Japanese Patent Application Laid Open No. 2005-304126, for example. FIG. 1 shows a configuration of a booster circuit 90 of such a booster circuit. The booster circuit 90 includes P channel MOS transistors P911 to P914, capacitors C1 to C4, P channel MOS transistors P921 and P923, N channel MOS transistors N921 and N923, and gate controllers 500, 600, 700, and 800.

The transistors P911 to P914 are connected in series between a supply voltage VDC1 and a boost voltage VDC3 to perform switching of a charge pump. The capacitors C1 to C4 are respectively connected to these transistors to maintain charge of the charge pump. The capacitor C1 is connected between a connection node of the transistors P911 and P912 and an output node of an inverter 921. The capacitor C2 is connected between a connection node of the transistors P912 and P913 and a voltage VSS. The capacitor C3 is connected between a connection node of the transistors P913 and P914 and an output node of an inverter 923. The capacitor C4 is connected between the supply voltage VDC3 and the supply voltage VSS.

The transistor P921 and the transistor N921 form the inverter 921. The transistor P923 and the transistor N923 form the inverter 923. The gate controllers 500, 600, 700, and 800 supply gate voltages VG1 to VG4 to the transistors P911 to P914, respectively.

The gate controller 500 includes inverters 521 to 523 and a level shifter 531. The gate controller 500 receives input of a boost clock signal VIN2, and applies the gate voltage VG1 to the transistor P911. The gate controller 600 includes inverters 621 to 623 and a level shifter 631. The gate controller 600 receives input of a boost clock signal VIN1, and applies the gate voltage VG2 to the transistor P912. The gate controller 700 includes inverters 721 to 723 and a level shifter 731. The gate controller 700 receives input of the boost clock signal VIN2, and applies the gate voltage VG3 to the transistor P913. The gate controller 800 includes inverters 821 to 823 and a level shifter 831. The gate controller 800 receives input of the boost clock signal VIN1, and applies the gate voltage VG4 to the transistor P914.

The boost clock signals VIN1 and VIN2 are signals whose high-level voltage is the supply voltage VDC1 and whose low-level voltage is the supply voltage VSS. The level shifters 531 and 631 each level-shift the high-level voltage of a corresponding one of these boost clock signals VIN1 and VIN2 from the voltage VDC1 to the voltage VDC2. Moreover, the level shifters 731 and 831 each level-shift the high-level voltage of a corresponding one of the boost clock signals VIN1 and VIN2 from the voltage VDC1 to the voltage VDC3.

The transistors P911 and P912, the inverter 921, and the capacitors C1 and C2 form first boost means, and the transistors P913 and P914, the inverter 923, and the capacitors C3 and C4 form second boost means. This booster circuit 90 performs charge pump operation when supplied with the boost clock signals VIN1 and VIN2. The first boost means boosts the supply voltage VDC1 to generate the supply voltage VDC2, and further, the second boost means boosts the supply voltage VDC2 to generate the supply voltage VDC3.

Here, for simplification of description, the supply voltage VSS as a reference voltage is as assumed to be 0 volt (grounding potential), and the supply voltage VDC1 is assumed to be V volts (for example, 2.8 volts). Moreover, description will be given assuming that the booster circuit 90 ideally operates, and that the supply voltage VDC2 is a voltage having been boosted to 2V volts (for example, 5.6 volts), and the supply voltage VDC3 is a voltage having been boosted to 3V volts (for example, 8.4 volts). Moreover, the transistors include a transistor having a breakdown voltage of approximately V (for example, 3 volts), a transistor having a breakdown voltage of approximately 2V (for example, 6 volts), and a transistor having a breakdown voltage of approximately 3V (for example, 9 volts), and these transistors will be referred to as a low breakdown voltage transistor, a middle breakdown voltage transistor, and a high breakdown voltage transistor, respectively.

FIG. 2 shows a configuration example of the level shifters 531, 631, 731, and 831 (generically referred to as n31). The level shifter n31 includes P channel MOS transistors P31 and P32, and N channel MOS transistors N31 and N32. Clock signals VINP and VINN are inputted into the gate of the N channel MOS transistor N31 and the gate of the N channel MOS transistor N32, respectively. The clock signal VINN is an inverted signal of the clock signal VINP.

The transistor P31 and the transistor N31 are connected in series between the supply voltage VDD and the supply voltage VSS. A connection node between the drains of the transistor P31 and the transistor N31 is connected to the gate of the transistor P32. The transistor P32 and the transistor N32 are connected in series between the supply voltage VDD and the supply voltage VSS. A connection node between the drains of the transistor P32 and the transistor N32 is connected to the gate of the transistor P31. An output signal VLSO whose high-level voltage is level-shifted to the voltage VDD is taken out from this node.

In the case of the level shifters 531 and 631, the voltage VDC2 (2V volts) is supplied as the supply voltage VDD. Therefore, in the level shifters 531 and 631, a voltage of 2V volts is applied between the gate and source or between the gate and drain of each transistor. The breakdown voltage of the low breakdown voltage transistor is inadequate when the breakdown voltage between the gate and source is approximately V volts. In other words, the middle breakdown voltage transistor having a breakdown voltage between the gate and source of approximately 2V volts needs to be used for each transistor of the level shifters 531 and 631.

In addition, in the case of the level shifters 731 and 831, the voltage VDC3, which is 3V volts, is supplied as the supply voltage VDD. Therefore, in the level shifters 731 and 831, a voltage of 3V volts is applied between the gate and source or between the gate and drain of each transistor. The breakdown voltage of the middle breakdown voltage transistor is inadequate when the breakdown voltage between the gate and source is approximately 2V volts. In other words, the high breakdown voltage transistor having a breakdown voltage between the gate and source of approximately 3V volts needs to be used for each transistor of the level shifters 731 and 831.

FIG. 3 shows a configuration of the inverters 521 to 523, 621 to 623, 721 to 723, and 821 to 823. Each inverter has a P channel MOS transistor P20 and an N channel MOS transistor N20 connected in series between supply voltages VDD1 and VDD0. An input signal INPUT is applied to the gate of the transistor P20 and the gate of the transistor N20, and an output signal OUTPUT is taken out from a connection node between the drains of the transistor P20 and the transistor N20. In the case of the inverters 521, 621, 721, and 821, the voltage VDC1 is supplied as the supply voltage VDD1, and the voltage VSS is supplied as the supply voltage VDD0. In the case of the inverters 522 to 523, 622 and 623, the voltage VDC2 is supplied as the supply voltage VDD1, and the voltage VSS is supplied as the supply voltage VDD0. In the case of the inverters 722, 723, 822, and 823, the voltage VDC3 is supplied as the supply voltage VDD1, and the voltage VDC1 is supplied as the supply voltage VDD0.

The inverters 521, 621, 721, and 821 are each supplied with the supply voltage VDC1 and the supply voltage VSS, and perform inversion operation to invert the clock signals VIN1 and VIN2. Therefore, the low breakdown voltage transistor can be used for the inverters 521, 621, 721, and 821. Moreover, the inverters 522, 523, 622, and 623 are each supplied with the supply voltage VDC2 and the supply voltage VSS, and function as an output buffer of the level shifters 531 and 631. Therefore, the middle breakdown voltage transistor needs to be used for the inverters 522, 523, 622, and 623. Further, the inverters 722, 723, 822, and 823 are each supplied with the supply voltage VDC3 and the supply voltage VDC1 and operate. The inverters 722 and 822 receive input of a signal, which changes between the supply voltage VDC3 and the supply voltage VSS, from the level shifters 731 and 831, respectively. The inverters 722 and 822 level-shift the low-level voltage of this input signal from the supply voltage VSS to the supply voltage VDC1. A voltage between the gate and source or between the gate and drain of the transistors included in the inverters 722 and 822 is 3V volts (for example, 8.4 volts). Therefore, the breakdown voltage of the middle breakdown voltage transistor is inadequate, and thus the high breakdown voltage transistor needs to be used. Moreover, the inverters 723 and 823 invert the signals which are outputted from the inverters 722 and 822, respectively, and which change between the voltage VDC1 and VDC3.

Next, operation of the booster circuit 90 will be described. Charge and discharge of the capacitors C1 and C3 are repeated by the switching operation of the transistors P911 to P914 and by the clock signal inversion operation of the inverters 921 and 923. Charge thereby moves to the capacitors C2 and C4, and the charge pump operation is performed. Specifically, the capacitor C1 is charged through the transistor P911, and the charge of the capacitor C1 moves to the capacitor C2 through the transistor P912, thereby to charge the capacitor C2. The voltage VDC2 of the capacitor C2 gradually rises, and reaches a voltage approximately twice (2V volts) the supply voltage VDC1 in the steady state. Moreover, the capacitor C3 is charged through the transistor P913, and the charge of the capacitor C3 moves to the capacitor C4 through the transistor P914, thereby to charge the capacitor C4. The voltage VDC3 of the capacitor C4 gradually rises, and reaches a voltage approximately three times (3V volts) the supply voltage VDC1 in the steady state.

FIGS. 4A to 4H show waveforms indicating voltage change of each part of the booster circuit 90 after reaching the steady state. The boost clock signals VIN1 (FIG. 4A) and VIN2 (FIG. 4B) are signals each having a phase opposite to the other. The high-level voltage is V volts and the low-level voltage is 0 volt.

The level shifters 531 and 631 level-shift the high level of the boost clock signals VIN2 and VIN1, respectively, so that signals whose high-level voltage is 2V volts and low-level voltage is 0 volt are obtained. These signals are each supplied as a gate voltage VG1 (FIG. 4F) of the transistor P911 and as a gate voltage VG2 (FIG. 4E) of the transistor P912. The transistors P911 and P912 are turned off when the gate voltage is at the high level, and turned on when the gate voltage is at the low level. Thereby, as shown in FIG. 4H, a voltage VP1 at one end of the capacitor C1 changes between 2V volts and V volts, and a voltage VM1 at the other end of the capacitor C1 changes between V volts and 0 volt.

The level shifters 731 and 831 level-shift the high level of the boost clock signals VIN2 and VIN1, respectively, to make the high-level voltage 3V volts. Moreover, each of the inverters 722 and 822 further level-shifts the low-level voltage of the thus-level-shifted signal to V volts. Thus, a gate voltage VG3 (FIG. 4D) applied to the gate of the transistor P913 and a gate voltage VG4 (FIG. 4C) applied to the gate of the transistor P914 are obtained. The transistors P913 and P914 are turned off when the gate voltage is at the high level, and turned on when the gate voltage is at the low level. Thereby, as shown in FIG. 4G, a voltage VP3 at one end of the capacitor C3 changes between 3V volts and 2V volts, and a voltage VM3 at the other end of the capacitor C3 changes between V volts and 0 volt.

Here, while the gate voltage VG3 of the transistor P913 and the gate voltage VG4 of the transistor P914 become 3V volts at the maximum, the minimum voltage becomes not 0 volt, but the voltage VDC1, i.e., V volts. A source voltage or drain voltage of the transistors P913 and P914 is 2V volts to 3V volts.

FIGS. 5A to 5F show voltage between nodes in each transistor. As shown in FIG. 5A, a voltage between the gate and source (drain) (VG2-VDC2, VG4-VDC3) of each of the transistors P912 and P914 changes between 0 volt and −2V volts. Moreover, as shown in FIG. 5B, a voltage between the gate and drain (source) (VG2-VP1, VG4-VP3) of each of the transistors P912 and P914 changes between V volts and −2V volts. Further, as shown in FIG. 5C, a voltage between the source and drain of each of the transistors P912 and P914 (VDC2-VP1, VDC3-VP3) changes between V volts and 0 volt.

Moreover, as shown in FIG. 5D, a voltage between the gate and source (drain) (VG1-VP1, VG3-VP3) of each of the transistors P911 and P913 changes between V volts and −2V volts. As shown in FIG. 5E, a voltage between the gate and drain (source) (VG1-VDC1, VG3-VDC2) of each of the transistors P911 and P913 changes between V volts and −V volts. Further, as shown in FIG. 5F, a voltage between the source and drain of each of the transistors P911 and P913 (VP1-VDC1, VP3-VDC2) changes between V volts and 0 volt.

SUMMARY

As can be seen in FIG. 5, in each of the transistors P913 and P914, the maximum value of the voltage between the gate and source (drain) and the maximum value of the voltage between the drain and source are 2V volts. Moreover, in each of the transistors P911 and P912, the maximum value of the voltage between the gate and source (drain) and the maximum value of the voltage between the drain and source are also 2V volts. Therefore, the transistors P911 to P914 that perform the charge pump operation need to be the middle breakdown voltage transistors having a breakdown voltage between the gate and sources (drain) of approximately 2V volts.

Thus, in the booster circuit 90, when the supply voltage VDC1 supplied is V volts (for example, 2.8 volts), the maximum value of the voltage applied between the gate and source (drain) of the transistors P911 to P914 that perform the charge pump operation is 2V volts (for example, 5.6 volts). When the breakdown voltage between the gate and source of the low breakdown voltage transistor is approximately V volts (for example, 3 volts), the gate voltage exceeds the value, and therefore, the middle breakdown voltage transistor must be used. However, the middle breakdown voltage transistor has a size larger than that of the low breakdown voltage transistor. Use of the middle breakdown voltage transistor therefore increases a substrate area, causing increase of a chip size and increase of cost.

Moreover, in the booster circuit 90, when the supply voltage VDC1 supplied is high, for example, approximately V=3 to 5 volts, the boost voltage approximately twice the supply voltage is 2V=6 to 10 volts. A still higher breakdown voltage is demanded of the transistors P911 to P914 that perform such charge pump operation, so that the high breakdown voltage transistor must be used. For this reason, the chip size further increases.

Thus, the configuration of the booster circuit 90 has difficulties in reduction of the chip size since the transistors P911 to P914 that perform the charge pump operation need a breakdown voltage approximately twice or more the supply voltage VDC1 supplied.

In one exemplary aspect of the present invention, a charge pump type booster has a boosting circuit including: a first transistor (P11/P13) and a second transistor (P12/P14), a first capacitor (C1/C3), a first drive circuit (21/23), a second capacitor (C2/C4), a first controller (100/300, 101/301), and a second controller (200/400). The boost circuit is supplied with a reference voltage (VSS), a supply voltage (VDC1), and a boost clock signal, and generates a second voltage by boosting the supply voltage. The first transistor (P11/P13) and the second transistor (P12/P14) are connected in series between a first voltage (VDC1/VDC2) and the second voltage (VDC2/VDC3). One end of the first capacitor (C1/C3) is connected to a connection node between the first transistor (P11/P13) and the second transistor (P12/P14). The first drive circuit (21/23) boosts a voltage at the other end of the first capacitor (C1/C3). The second capacitor (C2/C4) is connected between the second voltage (VDC2/VDC3) and the reference voltage (VSS). The first controller (100/300, 101/301) controls conduction/non-conduction of the first transistor (P11/P13). The second controller (200/400) inputs any of the first voltage (VDC1/VDC2) and the second voltage (VDC2/VDC3) to the second transistor (P12/P14), and thereby controls conduction/non-conduction of the second transistor (P12/P14). In another exemplary aspect of the present invention, a semiconductor device includes the above-mentioned booster circuit.

In still another exemplary aspect of the present invention, a method of controlling the booster circuit includes controlling first and second transistors, and controlling the booster circuit that generates a second voltage by boosting a supply voltage. The booster circuit includes a first transistor (P11/P13) and a second transistor (P12/P14), a first capacitor (C1/C3), a first drive circuit (21/23), and a second capacitor (C2/C4). The first transistor (P11/P13) and the second transistor (P12/P14) are connected in series between a first voltage (VDC1/VDC2) and a second voltage (VDC2/VDC3). One end of the first capacitor (C1/C3) is connected to a connection node between the first transistor (P11/P13) and the second transistor (P12/P14). The first drive circuit (21/23) boosts a voltage at the other end of the first capacitor (C1/C3). The second capacitor (C2/C4) is connected between the second voltage (VDC2/VDC3) and a reference voltage (VSS). At the step of controlling conduction/non-conduction of the first transistor (P11/P13), conduction/non-conduction of the first transistor (P11/P13) is controlled on the basis of a voltage (VP1/VP3) at the connection node between the first transistor (P11/P13) and the second transistor (P12/P14). At a step of controlling conduction/non-conduction of the second transistor (P12/P14), conduction/non-conduction of the second transistor (P12/P14) is controlled on the basis of the second voltage (VDC2/VDC3) and the first voltage (VDC1/VDC2).

According to exemplary aspects of the present invention, it is possible to provide a booster circuit and a semiconductor integrated circuit device that obtain a boost voltage by use of a transistor having a comparatively low breakdown voltage. Use of such a transistor having a low breakdown voltage can reduce a chip size, and can reduce costs.

BRIEF DESCRIPTION OF THE DRAWINGS

The above and other exemplary aspects, advantages and features of the present invention will be more apparent from the following description of certain exemplary embodiments taken in conjunction with the accompanying drawings, in which:

FIGS. 4A to 4H illustrates diagrams showing voltage change of each part of the booster circuit;

FIGS. 5A to 5F illustrates diagrams showing a voltage between nodes of each transistor;

FIGS. 8A to 8H illustrates diagram showing voltage change of each part of the booster circuit according to the first exemplary embodiment of the present invention;

FIGS. 9A to 9F illustrates diagram showing a voltage between nodes of each transistor of the booster circuit according to the first exemplary embodiment of the present invention;

FIG. 10 is a diagram showing a boost power supply part of a semiconductor device according to a second exemplary embodiment of the present invention;

FIGS. 12A to 12I illustrates diagrams showing voltage change of each part of the booster circuit according to the second exemplary embodiment of the present invention; and FIG. 13 illustrate diagrams showing a voltage between nodes of each transistor of the booster circuit according to the second exemplary embodiment of the present invention.

DETAILED DESCRIPTION OF THE EXEMPLARY EMBODIMENTS

Figure 6:
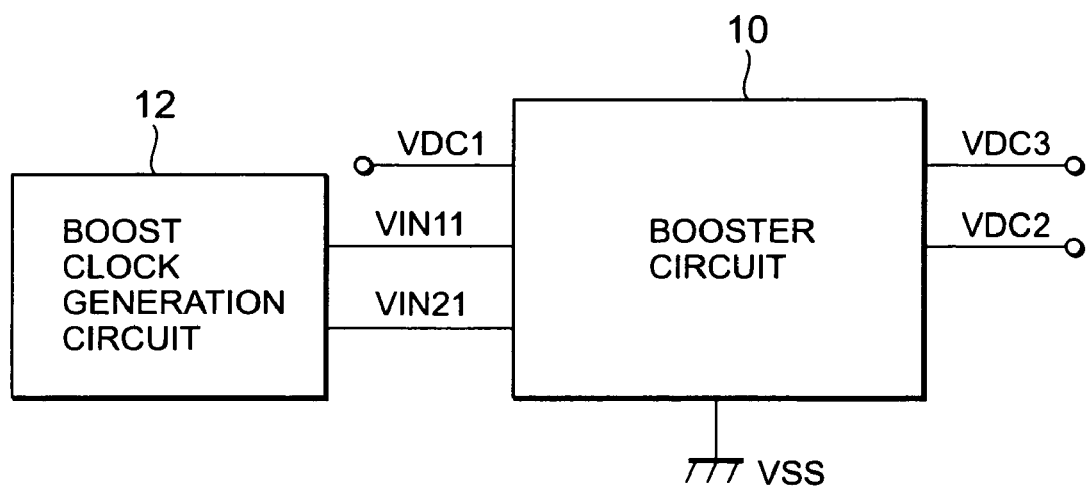
FIG. 6 is a diagram showing a boost power supply part of a semiconductor device according to a first exemplary embodiment of the present invention.

As shown in FIG. 6, a booster circuit 10 according to a first exemplary embodiment of the present invention is supplied with boost clock signals VIN11 and VIN21 from a boost clock generation circuit 12. The booster circuit 10 generates a voltage VDC2 and a voltage VDC3, which are voltages boosted to approximately twice and three times a supply voltage VDC1, respectively. Here, when a reference voltage level is not specified, a supply voltage VSS (0 volt) is used as a reference for a voltage of each node.

Figure 7:
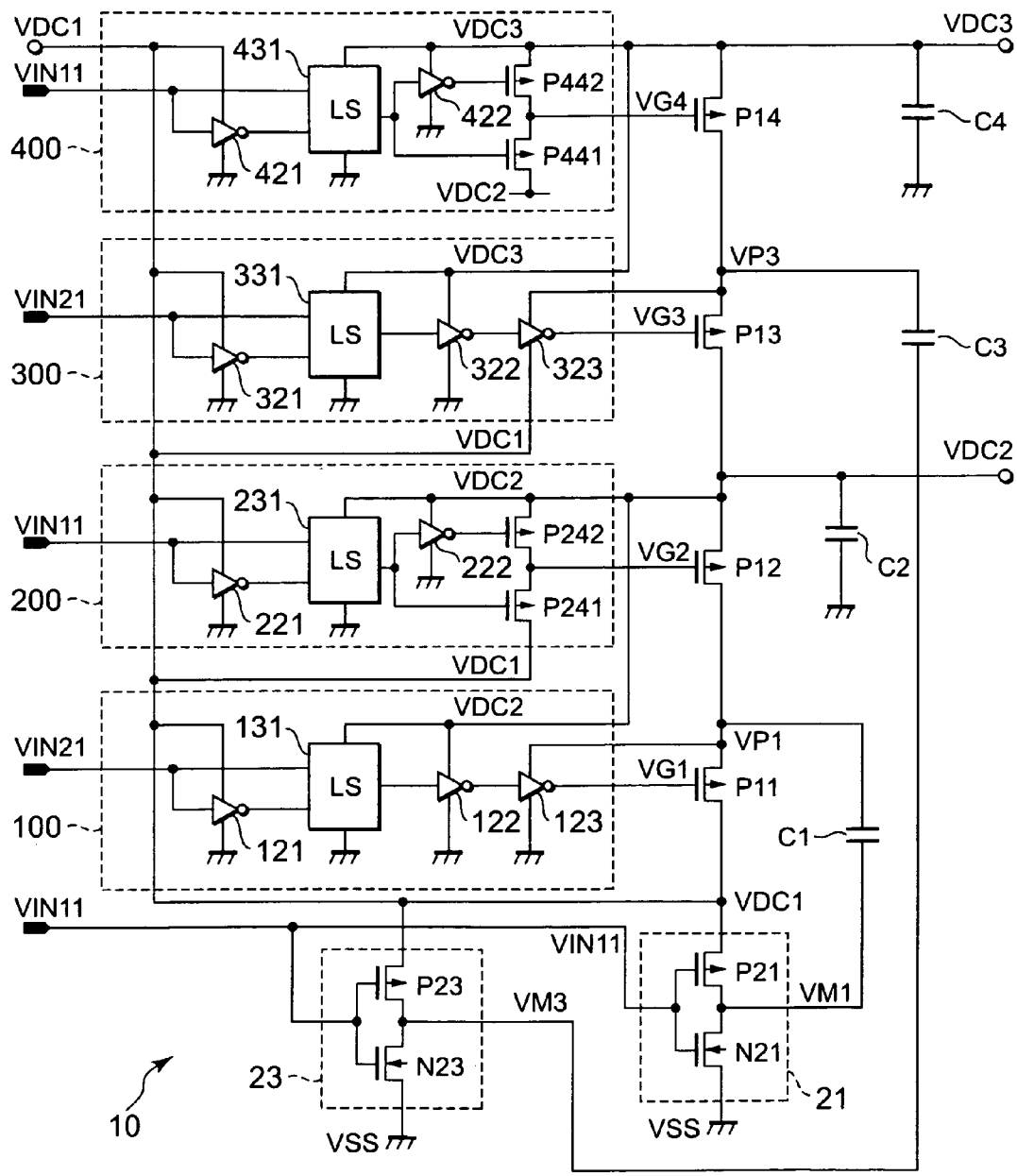
FIG. 7 is a diagram showing a configuration of a booster circuit according to the first exemplary embodiment of the present invention.

As shown in FIG. 7, the booster circuit 10 includes P channel MOS transistors P11 to P14, capacitors C1 to C4, inverters 21 and 23, and gate controllers 100, 200, 300, and 400.

The transistors P11 to P14 are connected to one another in series between the supply voltage VDC1 and the boost voltage VDC3, and each operate as a switch of charge pump operation. The capacitors C1 to C4 are connected to these transistors, and maintain charge generated by the charge pump operation. The capacitor C1 is connected between a connection node (voltage VP1) of the transistors P11 and P12 and an output node (voltage VM1) of the inverter 21. The capacitor C2 is connected between a connection node (voltage VDC2) of the transistors P12 and P13 and a voltage VSS. The capacitor C3 is connected between a connection node (voltage VP3) of the transistors P13 and P14 and an output node (voltage VM3) of the inverter 23. The capacitor C4 is connected between the voltage VDC3 and the voltage VSS.

The inverter 21 includes a P channel MOS transistor P21 and an N channel MOS transistor N21. The inverter 21 receives input of the boost clock signal VIN11, and generates the voltage VM1 that simultaneously changes voltages at both ends of the capacitor C1. The inverter 23 includes a P channel MOS transistor P23 and an N channel MOS transistor N23. The inverter 23 receives input of the boost clock VIN11, and generates the voltage VM3 that simultaneously changes voltages at both ends of the capacitor C3. The inverters 21 and 23 are each supplied with the voltage VDC1.

The gate controller 100 includes inverters 121 to 123 and a level shifter 131. The gate controller 100 receives input of the boost clock signal VIN21, and generates a voltage VG1 to be applied to the gate of the transistor P11. The boost clock signal VIN21 changes between the supply voltage VDC1 and the supply voltage VSS. The level shifter 131 receives input of the boost clock signal VIN21 and its inverted signal from the inverter 121. Then, the level shifter 131 performs level shift so that those signals may change between the supply voltage VDC2 and the supply voltage VSS, and then, outputs the level-shifted signals to the inverter 122. The inverter 122 outputs an inverted signal to the inverter 123. The inverter 123 further inverts the input signal, and applies the inverted signal to the gate of the transistor P11 as a gate voltage VG1. The supply voltages VDC1 and VSS are supplied to the inverter 121. The supply voltages VDC2 and VSS are supplied to the inverter 122 and the level shifter 131. The supply voltages VP1 and VSS are supplied to the inverter 123.

The gate controller 200 includes inverters 221 and 222, a level shifter 231, and P channel MOS transistors P241 and P242. The gate controller 200 receives input of the boost clock signal VIN11, and generates a voltage VG2 to be applied to the gate of the transistor P12. The boost clock signal VIN11 changes between the supply voltage VDC1 and the supply voltage VSS. The level shifter 231 receives input of the boost clock signal VIN11 and its inverted signal from the inverter 221. Then, the level shifter 231 performs level shift so that those signals may change between the supply voltage VDC2 and the supply voltage VSS, and then, outputs the level-shifted signals to the gate of the transistor P241 and to the inverter 222. The inverter 222 inverts the input signal and applies the inverted signal to the gate of the transistor P242. The supply voltages VDC1 and VSS are supplied to the inverter 221, and the supply voltages VDC2 and VSS are supplied to the level shifter 231 and the inverter 222. Moreover, the supply voltage VDC1 is supplied to the transistor P241, and the supply voltage VDC2 is supplied to the transistor P242. Since a connection node between the transistors P241 and P242 is connected to the gate of the transistor P12, the voltage VDC1 or the voltage VDC2 is applied to the gate of the transistor P12.

The gate controller 300 includes inverters 321 to 323 and a level shifter 331. The gate controller 300 receives input of the boost clock signal VIN21, and generates a voltage VG3 to be applied to the gate of the transistor P13. The level shifter 331 receives input of the boost clock signal VIN21 and its inverted signal from the inverter 321. Then, the level shifter 331 performs level shift so that those signal's may change between the supply voltage VDC3 and the supply voltage VSS, and then, outputs the level-shifted signals to the inverter 322. The inverter 322 outputs an inverted signal to the inverter 323. The inverter 323 further inverts the input signal and applies the inverted signal to the gate of the transistor P13 as the gate voltage VG3. The supply voltages VDC1 and VSS are supplied to the inverter 321. The supply voltages VDC3 and VSS are supplied to the inverter 322 and the level shifter 331. The supply voltages VP3 and VDC1 are supplied to the inverter 323.

The gate controller 400 includes inverters 421 and 422, a level shifter 431, and P channel MOS transistors P441 and P442. The gate controller 400 receives input of the boost clock signal VIN11, and generates a voltage VG4 to be applied to the gate of the transistor P14. The level shifter 431 receives input of the boost clock signal VIN11 and its inverted signal from the inverter 421. Then, the level shifter 431 performs level shift so that those signals may change between the supply voltage VDC3 and the supply voltage VSS, and then, outputs the level-shifted signals to the gate of the transistor P441 and the inverter 422. The inverter 422 applies an inverted signal to the gate of the transistor P442. The supply voltages VDC1 and VSS are supplied to the inverter 421, and the supply voltages VDC3 and VSS are supplied to the level shifter 431 and the inverter 422. Moreover, the supply voltage VDC2 is supplied to the transistor P441, and the supply voltage VDC3 is supplied to the transistor P442. Since a connection node between the transistors P441 and P442 is connected to the gate of the transistor P14, the voltage VDC2 or the voltage VDC3 is applied to the gate of the transistor P14.

The first boost means includes the transistors P11 and P12, the inverter 21, and the capacitors C1 and C2. The second boost means includes the transistors P13 and P14, the inverter 23, and the capacitors C3 and C4. The boost circuit 10 receives input of the boost clock signals VIN11 and VIN21, and performs the charge pump operation. Then, the first boost means boosts the supply voltage VDC1 to generate the supply voltage VDC2, and the second boost means further boosts the supply voltage VDC2 to generate the supply voltage VDC3. Here, for simplification of description, the following assumptions are made. Specifically, the supply voltage VSS as the reference voltage is 0 volt (ground voltage), the supply voltage VDC1 is V bolt (for example, 2.8 volts), the supply voltage VDC2 is 2V volts (for example, 5.6 volts), and the supply voltage VDC3 is 3V volts (for example, 8.4 volts). Moreover, the transistors include a transistor having a breakdown voltage of approximately V (for example, 3 volts), a transistor having a breakdown voltage of approximately 2V (for example, 6 volts), and a transistor having a breakdown voltage of approximately 3V (for example, 9 volts), and these transistors will be referred to as a low breakdown voltage transistor, a middle breakdown voltage transistor, and a high breakdown voltage transistor, respectively.

Figure 1:
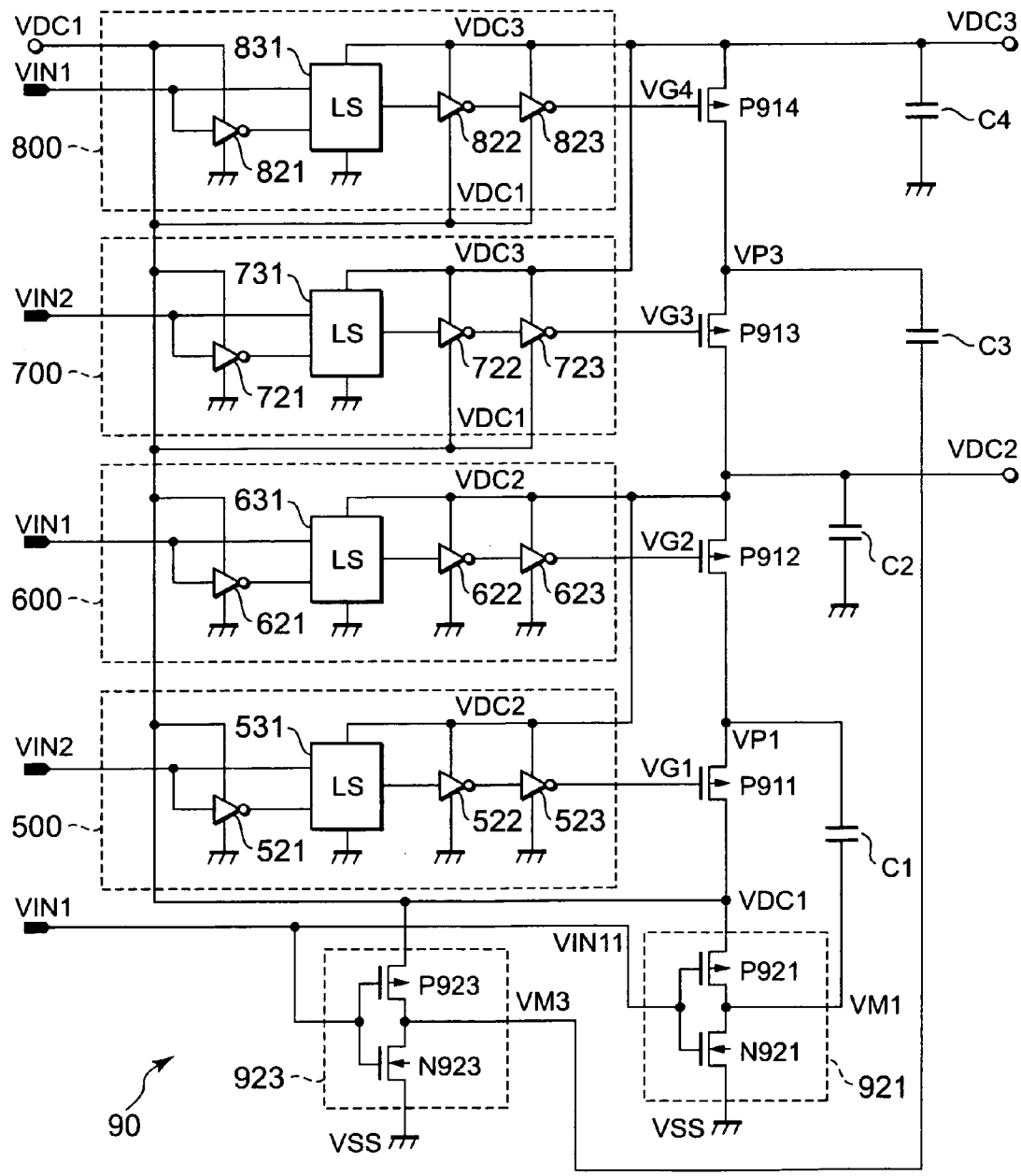
FIG. 1 is a circuit diagram showing a configuration example of a booster circuit.
Figure 2:
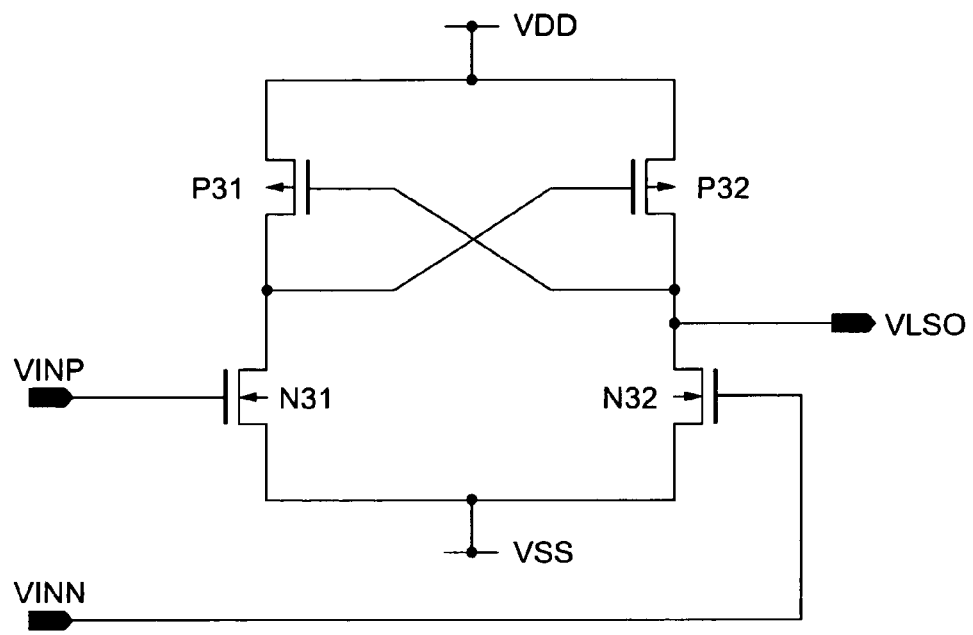
FIG. 2 is a circuit diagram showing a configuration example of a level shifter.

As shown in FIG. 2, the level shifters 131, 231, 331, and 431 (generically referred to as n31) each include P channel MOS transistors P31 and P32, and N channel MOS transistors N31 and N32. A clock signal VINP is inputted into the gate of the transistor N31, and a VINN is inputted into the gate of the transistor N32. The clock signal VINN is an inverted signal of the clock signal VINP. While this level shifter n31 has the same configuration as that of the level shifter described in the background art, the level shifter n31 may have other configuration.

The transistor P31 and the transistor N31 are connected in series between a supply voltage VDD and a supply voltage VSS. A connection node between the drain of the transistor P31 and the drain of the transistor N31 is connected to the gate of the transistor P32. The transistor P32 and the transistor N32 are connected in series between the supply voltage VDD and the supply voltage VSS. A connection node between the drain of the transistor P32 and the drain of the transistor N32 is connected to the gate of the transistor P31. An output signal VLSO whose high level is level-shifted to the voltage VDD is taken out from this node.

In the case of the level shifters 131 and 231, the supply voltage VDC2 is supplied as the supply voltage VDD. Therefore, in the level shifters 131 and 231, a voltage of 2V volts is applied between the gate and source, or between the gate and drain, of each transistor. For that reason, the breakdown voltage of the low breakdown voltage transistor is inadequate when the breakdown voltage between the gate and source is approximately V volts. Accordingly, the middle breakdown voltage transistor having a breakdown voltage between the gate and source of approximately 2V volts needs to be used for each transistor of the level shifters 131 and 231.

Moreover, in the case of the level shifters 331 and 431, the supply voltage VDC3 is supplied as the supply voltage VDD. Therefore, in the level shifters 331 and 431, a voltage of 3V volts is applied between the gate and source, or between the gate and drain, of each transistor. The breakdown voltage of the middle breakdown voltage transistor is inadequate when the breakdown voltage between the gate and source is approximately 2V volts. Accordingly, the high breakdown voltage transistor having a breakdown voltage between the gate and source of approximately 3V volts needs to be used for each transistor of the level shifters 331 and 431.

Figure 3:
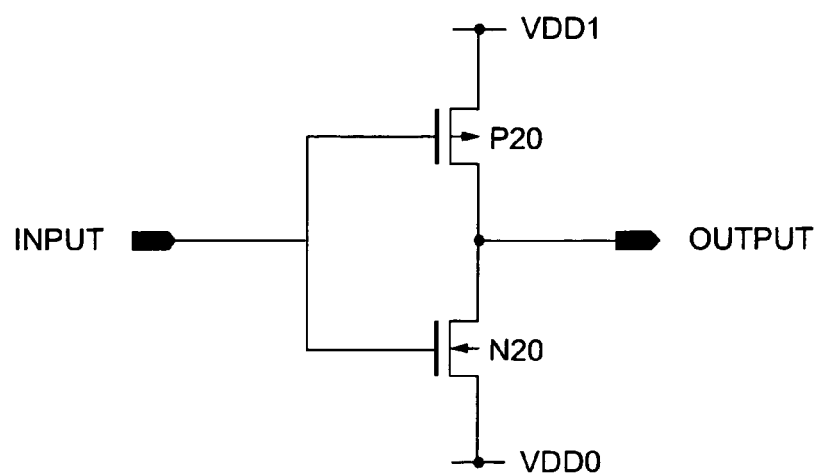
FIG. 3 is a circuit diagram showing a configuration example of an inverter.

FIG. 3 shows a configuration of the inverters 121 to 123, 221 and 222, 321 to 323, 421 and 422. In the inverter, a P channel MOS transistor P20 and an N channel MOS transistor N20 are connected in series between supply voltages VDD1 and VDD0. An input signal INPUT is applied to the gate of each transistor, and an output signal OUTPUT is taken out from a connection node between the drains of the respective transistors.

In the case of the inverters 121, 221, 321, and 421, the voltage VDC1 (V bolt) is supplied as the supply voltage VDD1, and the voltage VSS is supplied as the supply voltage VDD0. Therefore, the low breakdown voltage transistor can be used for the transistors of these inverters. Moreover, in the case of the inverters 122 and 222, the supply voltage VDC2 (a maximum of 2V volts) is supplied as the supply voltage VDD1, and the supply voltage VSS is supplied as the supply voltage VDD0. Therefore, the middle breakdown voltage transistor needs to be used for the transistors of these inverters. Further, in the case of the inverters 322 and 422, the supply voltage VDC3 (a maximum of 3V volts) is supplied as the supply voltage VDD1, and the supply voltage VSS is supplied as the supply voltage VDD0. Therefore, the high breakdown voltage transistor needs to be used for the transistors of these inverters.

In the case of the inverter 123, the voltage VP1 at the connection node between the transistors P11 and P12 is supplied as the supply voltage VDD1, and the supply voltage VSS is supplied as the supply voltage VDD0. Therefore, the output becomes a level of the voltage VP1 when the input of the inverter 123 is at a low level (VSS). The output of the inverter 123 is connected to the gate of the transistor P11. For that reason, when a low-level voltage (VSS) is applied to the input of the inverter 123, the transistor P11 is turned off (electrically non-conducted). When the input of the inverter 123 is at a high level (VDC2), the output becomes the low level (VSS), so that the transistor P11 is turned on (electrically conducted). The voltage of 2V volts is applied to each transistor of the inverter 123 between the gate and source or between the gate and drain. Accordingly, the middle breakdown voltage transistors need to be used for the transistors of the inverter 123.

In the case of the inverter 323, the voltage VP3 at the connection node between the transistors P13 and P14 is supplied as the supply voltage VDD1, and the supply voltage VDC1 is supplied as the supply voltage VDD0. Therefore, when the input of the inverter 323 is at a low level (voltage VSS), the output voltage VG3 is the voltage VP3. The output of the inverter 323 is connected to the gate of the transistor P13. For that reason, when the low-level voltage (voltage VSS) is applied to the input of the inverter 323, the transistor P13 is turned off. When the input of the inverter 323 is at a high level (voltage VDC3), the transistor N20 outputs the supply voltage VDD0 as a low-level voltage. Therefore, the output voltage VG3 becomes the low level (voltage VDC1), and the transistor P13 is turned on. Since the voltage of 3V volts is applied to each transistor of the inverter 323 between the gate and source (drain), the high breakdown voltage transistors need to be used for the transistors of the inverter 323.

The transistors P242 and P241 are connected in series between the supply voltage VDC2 and the supply voltage VDC1. A connection node between the transistors P242 and P241 is connected to the gate of the transistor P12. The gate of the transistor P241 is directly connected to the output of the level shifter 231, and the gate of the transistor P242 is connected to the output of the level shifter 231 through the inverter 222. A signal applied to the gate of the transistor P241 and to the gate of the transistor P242 changes between the supply voltage VDC2 and the supply voltage VSS Therefore, a clock signal applied to the gate of the transistor P241 has a phase opposite to that applied to the gate of the transistor P242. As a result, the transistors P241 and P 242 operate such that when one is turned on, the other is turned off. When the transistor P241 is turned on, the voltage VDC1 is applied to the gate of the transistor P12. When the transistor P242 is turned on, the voltage VDC2 is applied to the gate of the transistor P12. In other words, the transistor 241 functions as level shifting means that slices the output signal outputted from the level shifter 231 and shifts the low level from the supply voltage VSS to the supply voltage VDC1. The transistor P12 is turned off when the gate voltage VG2 is the voltage VDC2, and turned on when the gate voltage VG2 is the voltage VDC1. Therefore, when the transistor P241 is turned on, the transistor P12 is turned on; when the transistor P242 is turned on, the transistor P12 is turned off.

Here, operation at the time of starting the boost operation will be described. Before the first boost means starts the charge pump operation, the voltage VDC2 is equal to the supply voltage VDC1. In other words, the boost operation is started in a state that the capacitor C2 is charged up to the supply voltage VDC1.

The gate voltage of the transistors P241 and P242 is an output of the level shifter 231 and an output of the inverter 222, respectively, which are supplied with the supply voltage VDC2 and the supply voltage VSS. The gate voltage of each of the transistors P241 and P242 changes between the voltage VDC2 and the voltage VSS in response to the boost clock VIN11. Namely, in the transistors P241 and P242, the low level of the gate voltage is the supply voltage VSS, and one of the transistors P241 and P242 is turned on. At the time of starting the charge pump operation, supply voltage VDC2=supply voltage VDC1. Therefore, one of the transistors P241 and P242 is turned on, and the voltage VDC1 is given to the gate of the transistor P12. Thus, at the time of starting the charge pump operation, an unstable state of the gate voltage VG2 of the transistor P12 is prevented, and switching operation of the transistor P12 normally functions. When the gate voltage VG2 of the transistor P12 is unstable at the time of starting the operation, the transistor P12 is not turned on and the capacitor C2 cannot be charged with the charge of the capacitor C1. For that reason, the charge pump operation is not normally performed.

When the boost clock signal VIN11 is at the low level, the transistor P241 is turned on to supply the voltage VDC1 to the gate of the transistor P12 (VG2=VDC1). Simultaneously, the output of the inverter 21 becomes the high level, and the voltage VM1 at the connection node connected to the capacitor C1 is raised (VM1=VDC1), so that the voltage VP1 between the connection node of the capacitor C1 and the transistor P11 is boosted (VP1=VM1+VDC1=2·VDC1). Thus, the transistor P12 is turned on, charge moves from the capacitor C1 to the capacitor C2, the capacitor C2 is charged, and the voltage VDC2 increases.

In the transistors P241 and P242, since the voltage of 2V volts is applied between the gate and source (drain), the middle breakdown voltage transistor needs to be used. However, in the transistor P12, since only the voltage of V bolt is applied between the gate and source (drain) and between the source and drain, the low breakdown voltage transistor can be used.

On the other hand, the transistors P442 and P441 are connected in series between the supply voltage VDC3 and the supply voltage VDC2. The connection node between the transistors P442 and P441 is connected to the gate of the transistor P14. The gate of the transistor P441 is directly connected to the output of the level shifter 431, and the gate of the transistor P442 is connected to the output of the level shifter 431 through the inverter 422. A signal applied to the gate of the transistor P441 and the gate of the transistor P442 changes between the supply voltage VDC3 and the supply voltage VSS. Therefore, a clock signal applied to the gate of the transistor P441 has a phase opposite to that applied to the gate of the transistor P442. As a result, the transistors P441 and P442 operate such that when one is turned on, the other is turned off. When the transistor P441 is turned on, the voltage VDC2 is applied to the gate of the transistor P14. When the transistor P442 is turned on, the voltage VDC3 is applied to the gate of the transistor P14. Namely, the transistor P441 functions as level shifting means that slices the output signal outputted from the level shifter 431, and shifts the low level from the supply voltage VSS to the supply voltage VDC2. The transistor P14 is turned off when the gate voltage VG4 is the voltage VDC3, and the transistor P14 is turned on when the gate voltage VG4 is the voltage VDC2. Therefore, when the transistor P441 is turned on, the transistor P14 is turned on, and when the transistor P442 is turned on, the transistor P14 is turned off.

Here, operation at the time of starting the boost operation will be described. Before the second boost means starts the charge pump operation, the voltage VDC3 is equal to the supply voltage VDC2. In other words, the boost operation is started in the state that the capacitor C4 is charged up to the supply voltage VDC2.

The gate voltage of the transistors P441 and P442 is an output of the level shifter 431 and an output of the inverter 422, respectively, which are supplied with the supply voltage VDC3 and the supply voltage VSS. The gate voltage of each of the transistors P441 and P442 changes between the voltage VDC3 and the voltage VSS in response to the boost clock VIN11. Namely, in the transistors P441 and P442, the low level of the gate voltage is the supply voltage VSS, and one of the transistors P441 and P442 is turned on. At the time of starting the charge pump operation, supply voltage VDC3=supply voltage VDC2. Therefore, one of the transistors P441 and P442 is turned on, and the voltage VDC2 is given to the gate of the transistor P14. Thus, at the time of starting the charge pump operation, an unstable state of the gate voltage VG4 of the transistor P14 is prevented, and switching operation of the transistor P14 normally functions. When the gate voltage VG4 of the transistor P14 is unstable at the time of starting the operation, the transistor P14 is not turned on, and the capacitor C4 cannot be charged with the charge of the capacitor C3. For that reason, the charge pump operation is not normally performed.

When the boost clock signal VIN11 is at the low level, the transistor P441 is turned on to supply the voltage VDC2 to the gate of the transistor P12 (VG4=VDC2). Simultaneously, the output of the inverter 23 becomes the high level, and the voltage VM3 at the connection node connected to the capacitor C3 is raised (VM3=VDC1), so that the voltage VP3 between the connection node of the capacitor C3 and the transistor P13 is boosted (VP3=VM3+VDC2=3·VDC1). Thus, the transistor P14 is turned on, charge moves from the capacitor C3 to the capacitor C4, the capacitor C4 is charged, and the voltage VDC3 increases.

In the transistors P441 and P442, since the voltage of 3V volts (for example, 8.4 volts) is applied between the gate and source (drain), the high breakdown voltage transistor needs to be used. However, in the transistor P14, since only the voltage of V bolt (for example, 2.8 volts) is applied between the gate and source (drain) and between the source and drain, the low breakdown voltage transistor can be used.

Next, with reference to FIGS. 8 and 9, operation in the steady state of the booster circuit 10 will be described. FIGS. 8 and 9 each show a voltage waveform of each part of the booster circuit 10. In the booster circuit 10, charge and discharge of the capacitors C1 and C3 are repeated by the switching operation of the transistors P11 to P14 and by the inversion operation of the inverters 21 and 23, and charge thereby moves from the capacitors C1 and C3 to the capacitors C2 and C4. The charge pump operation is thereby performed. As a result, the capacitor C2 is charged through the transistor P12. The voltage VDC2 of the capacitor C2 gradually rises, and reaches approximately twice the supply voltage VDC1 (2V volts) in the steady state. Moreover, the capacitor C4 is charged through the transistor P14. The voltage VDC3 of the capacitor C4 gradually rises, and reaches approximately three times the supply voltage VDC1 (3V volts) in the steady state.

The boost clock generation circuit 12 generates the boost clock signal VIN11 and the boost clock signal VIN21, and supplies the signals VIN11 and VIN21 to the booster circuit 10. As shown in FIG. 8A, a falling timing of the boost clock signal VIN11 is delayed by Δt1 from a rising timing of the boost clock signal VIN21. As shown in FIG. 8B, a falling timing of the boost clock signal VIN21 is delayed by Δt1 from a rising timing of the boost clock signal VIN11. Considering the falling transition time of the voltage VP1 at the connection node between the transistors P11 and P12 and the falling transition time of the voltage VP3 at the connection node between the transistors P13 and P14, Δt1 is set to be not less than these transition times. Preferably, the boost clock generation circuit 12 is configured to allow adjustment of Δt1.

As shown in FIGS. 8A and 8B, the boost clock signals VIN11 and VIN21 change between V bolt and 0 volt. As shown in FIGS. 8H and 8G, the output VM1 of the inverter 21 and the output VM3 of the inverter 23 change between 0 volt and V bolt in response to the boost clock signal VIN11. The signal VG1 is applied to the gate of the transistor P11, and the signal VG3 is applied to the gate of the transistor P13 (FIG. 8 F, FIG. 8D). Here, the signals VG1 and VG3 are obtained by level shifting of the boost clock signal VIN21 by the gate controllers 100 and 300, respectively.

The level shifter 131 shifts the high level of the boost clock signal VIN21, and generates a signal that changes between 2V volts and 0 volt. This signal is inverted by the inverter 122 supplied with the supply voltage VDC2, and is further inverted by the inverter 123 supplied with the supply voltage VP1. The supply voltage VP1 is a voltage at the other end of the capacitor C1 whose one end is connected to the output of the inverter 21. As shown in FIG. 8H, the supply voltage VP1 changes in response to the boost clock signal VIN11. Therefore, as shown in FIG. 8F, in the gate controller 100, the gate voltage VG1 that changes from 2V volts through 1V volts to 0 volt is generated, and is applied to the gate of the transistor P11.

Moreover, the level shifter 231 level-shifts the high level of the boost clock signal VIN11, and the transistor P241 level-shifts the low level of the boost clock signal VIN11. Therefore, as shown in FIG. 8E, the gate voltage VG2 that changes between the supply voltage VDC1 and the supply voltage VDC2 is applied to the gate of the transistor P12.

The level shifter 331 shifts the high level of the boost clock signal VIN21, and generates a signal that changes between 3V volts and 0 volt. This signal is inverted by the inverter 322 supplied with the supply voltage VDC3, and is further inverted by the inverter 323 supplied with the supply voltage VP3. The supply voltage VP3 is a voltage at the other end of the capacitor C3 whose one end is connected to the output of the inverter 23. As shown in FIG. 8G, the supply voltage VP3 changes in response to the boost clock signal VIN11. Therefore, as shown in FIG. 8D, in the gate controller 300, the gate voltage VG3 that changes from 3V volts through 2V volts to 1V volts is generated, and applied to the gate of the transistor P13.

Moreover, the level shifter 431 level-shifts the high level of the boost clock signal VIN11, and the transistor P441 level-shifts the low level of the boost clock signal VIN11. There-fore, as shown in FIG. 8C, the gate voltage VG4 that changes between the supply voltage VDC2 and the supply voltage VDC3 (changes between 3V volts and 2V volts) is applied to the gate of the transistor P14.

As shown in FIG. 8C, while a maximum of 3V volts of voltage is applied as the gate voltage VG4 of the transistor P14, a minimum of the gate voltage VG4 is 2V volts. The source voltage or drain voltage of the transistor P14 is 2V volts to 3V volts. The maximum of the voltage between the gate and source (drain) is ±V (for example, ±2.8) volt, as shown in FIGS. 9A and 9B. FIG. 9A shows a waveform of the voltage between the gate and source (drain) (VG4-VDC3) of the transistor P14, and FIG. 9B shows a waveform of the voltage between the gate and drain (source) (VG4-VP3) of the transistor P14. Moreover, as shown in FIG. 9C, a voltage between the source and drain of the transistor P14 (VDC3-VP3) is a maximum of V volts.

As shown in FIG. 8D, while a maximum of 3V volts of voltage is applied as the gate voltage VG3 of the transistor P13, a minimum of the gate voltage VG3 is V volts. Moreover, the source voltage or drain voltage of the transistor P13 is 2V volts to 3V volts. Here, the falling delay timing Δt1 of the boost clock signals VIN11 and VIN21 is adjusted to be not less than the falling transition time of the voltage VP3 at the connection node between the transistors P14 and P13. For that reason, after the voltage VP3 becomes 2V volts, the gate voltage VG3 of the transistor P13 becomes the minimum of V volts. Therefore, as shown in FIGS. 9D and 9E, the maximum of the voltage between the gate and source (drain) is ±V volts. FIG. 9D shows a waveform of the voltage between the gate and source (drain) (VG3-VP3) of the transistor P13, and FIG. 9E shows a waveform of the voltage between the gate and drain (source) (VG3-VDC2) of the transistor P13. Moreover, as shown in FIG. 9F, the voltage between the source and drain of the transistor P13 (VP3-VDC2) is a maximum of V volts.

As shown in FIG. 8E, while a maximum of 2V volts of voltage is applied as the gate voltage VG2 of the transistor P12, a minimum of the gate voltage VG2 is V volts. Moreover, the source voltage or drain voltage of the transistor P12 is V volts to 2V volts. As shown in FIGS. 9A and B, the maximum of the voltage between the gate and source (drain) is ±V volts (for example, ±2.8 volts). FIG. 9A shows a waveform of the voltage between the gate and source (drain) (VG2-VDC2) of the transistor P12, and FIG. 9B shows a waveform of the voltage between the gate and drain (source) (VG2-VP1) of the transistor P12. Moreover, as shown in FIG. 9C, the voltage between the source and drain of the transistor P12 (VDC2-VP1) is a maximum of V volts.

As shown in FIG. 8F, the gate voltage VG1 of the transistor P11 is a maximum of 2V volts, and the minimum of the gate voltage VG1 is 0 volt. Moreover, the source voltage or drain voltage of the transistor P11 is V volts to 2V volts. Here, the falling delay timing Δt1 of the boost clock signals VIN11 and VIN21 is adjusted to be not less than the rise transition time of the voltage VP1 at the connection node between the transistors P12 and P11. For that reason, after the voltage VP1 becomes V volts, the gate voltage VG1 of the transistor P11 becomes the minimum of 0 volt. Therefore, as shown in FIGS. 9D and 9E, the maximum of the voltage between the gate and source (drain) is ±V volts. FIG. 9D shows a waveform of the voltage between the gate and drain (source) (VG1-VP1) of the transistor P11, and FIG. 9 E shows a waveform of the voltage between gate and drain (source) (VG1-VDC1) of the transistor P11. Moreover, as shown in FIG. 9F, the voltage between the source and drain of the transistor P11 (VP1-VDC1) is a maximum of V volts.

Thus, in the booster circuit 10, the connection node between the transistors P241 and P242, which are connected in series between the supply voltage VDC2 and the supply voltage VDC1, is connected to the gate of the transistor P12 serving as a path to transfer charge from the capacitor C1 to the capacitor C2. For that reason, the voltage applied between the gate and source (drain) of the transistor P12 and that applied between the source and drain thereof can be reduced to ±V volts at the maximum. For this reason, the low breakdown voltage transistor having the same breakdown voltage as that of the transistor that supplies the input signal can be used for the transistor P12.

Furthermore, also in the state where the supply voltage VDC2 and the supply voltage VDC1 have the same voltage before the first boost means starts the charge pump operation, since the low level of the gate voltage of the transistor P242 and the low level of the gate voltage of the transistor P242 are at the supply voltage VSS, one of the transistors P242 and P241 is turned on (electrically conducted). For that reason, at the time when the first boost means starts the charge pump operation, an unstable state of the gate voltage VG2 of the transistor P12 is prevented, and the switching operation of the transistor P12 normally functions. When the gate voltage VG2 of the transistor P12 is unstable, the transistor P12 is not turned on, and discharge operation for transferring the charge of the capacitor C1 to the capacitor C2 that maintains the supply voltage VDC2 is not performed. Accordingly, the charge pump operation is not performed normally.

The supply voltage VDC1 is supplied to the transistor P12 as the gate voltage VG2 when the transistor P241 is turned on. Furthermore, when the voltage VP1 at the connection node of the capacitor C1 becomes approximately twice the supply voltage VDC1 (2V volts) by the inversion operation by the inverter 21, the discharge operation for transferring charge to the capacitor C2 that maintains the supply voltage VDC2 is performed.

Similarly, the connection node between the transistors P441 and P442, which are connected in series between the supply voltage VDC3 and the supply voltage VDC2, is connected to the gate of the transistor P14 serving as a path to transfer charge from the capacitor C3 to the capacitor C4. For that reason, the voltage applied between the gate and source (drain) of the transistor P14 and that applied between the source and drain thereof can be reduced to ±V volts at the maximum. For this reason, the low breakdown voltage transistor having the same breakdown voltage as that of the transistor that supplies the input signal can be used for the transistor P14.

Furthermore, also in the state where the supply voltage VDC3 and the supply voltage VDC2 have the same voltage before the second boost means starts the charge pump operation, since the low level of the gate voltage of the transistor P442 and the low level of the gate voltage of the gate voltage of the transistor P441 are at the supply voltage VSS, one of the transistors P442 and P441 is turned on (electrically conducted). For that reason, at the time when of the second boost means starts the charge pump operation, an unstable state of the gate voltage VG4 of the transistor P14 is prevented, and the switching operation of the transistor P14 normally functions. When the gate voltage VG4 of the transistor P14 is unstable, the transistor P14 is not turned on, and discharge operation for transferring the charge of the capacitor C3 to the capacitor C4 that maintains the supply voltage VDC3 is not performed. Accordingly, the charge pump operation is not performed normally. The supply voltage VDC2 is supplied to the transistor P14 as the gate voltage VG4 when the transistor P441 is turned on. Furthermore, when the voltage VP3 at the connection node of the capacitor C3 becomes approximately three times the supply voltage VDC1 (3V volts) by the inversion operation by the inverter 23, the discharge operation for transferring charge to the capacitor C4 that maintains the supply voltage VDC3 is performed.

On the other hand, in the first boost means, while the gate voltage VG1 of the transistor P11 that performs charging operation from the supply voltage VDC1 to the capacitor C1 is 2V volts at the maximum, the minimum of the gate voltage VG1 is 0 volt, and the source voltage or drain voltage is V volts to 2V volts. Here, the falling delay timing Δt1 of the boost clock signals VIN11 and VIN21 is adjusted to be not less than the falling transition time of the voltage VP1 at the connection node between the transistors P11 and P12. For that reason, after the voltage VP1 becomes V volts, the gate voltage VG1 of the transistor P11 becomes the minimum of 0 volt. Therefore, as shown in FIGS. 9D and 9E, the maximum of the voltage (VG1-VP1) and the voltage (VG1-VDC1), which are the voltage between the gate and source or the voltage between the gate and drain, is ±V volts. For this reason, the low breakdown voltage transistor having the same breakdown voltage as that of the transistor that supplies the input signal can be used for the transistor P11.

Similarly, in the second boost means, while the gate voltage VG3 of the transistor P13 that performs charging operation from the supply voltage VDC2 to the capacitor C3 is 3V volts at the maximum, the minimum of the gate voltage VG3 is 0 volt, and the source voltage or drain voltage is 2V volts to 3V volts. Here, the falling delay timing Δt1 of the boost clock signals VIN11 and VIN21 is adjusted to be not less than the falling transition time of the voltage VP3 at the connection node between the transistors P14 and P13. For that reason, after the voltage VP3 becomes 2V volts, the gate voltage VG2 of the transistor P13 becomes the minimum of V volts. Therefore, as shown in FIGS. 9D and 9E, the maximum value of the voltage (VG3-VP3) and the voltage (VG3-VDC2), which are the voltage between the gate and source or the voltage between the gate and drain, is ±V volts. For this reason, the low breakdown voltage transistor having the same breakdown voltage as that of the transistor that supplies the input signal can be used for the transistor P13.

Therefore, the low breakdown voltage transistor having the breakdown voltage between the gate and source of approximately V volts (for example, 3 volts) can be used for the transistors P11 to P14 that perform the charge pump operation. By replacing the middle breakdown voltage transistor with the low breakdown voltage transistor having the breakdown voltage approximately ½ of that of the middle breakdown voltage transistor, the size of a transistor can be reduced (for example, not ½ or less). Particularly, the transistors P11 to P14 are transistors that send a large amount of current, and an effect of size reduction is significant. In other words, by selecting a device that satisfies the breakdown voltage of the transistor that supplies the input signal in a wide range of input power voltages, the breakdown voltage of the transistors P11 to P14 that perform the charge pump operation can also be made optimal. Therefore, an efficient boost output can be obtained, while reducing the substrate area of the booster circuit.

Figure 11:
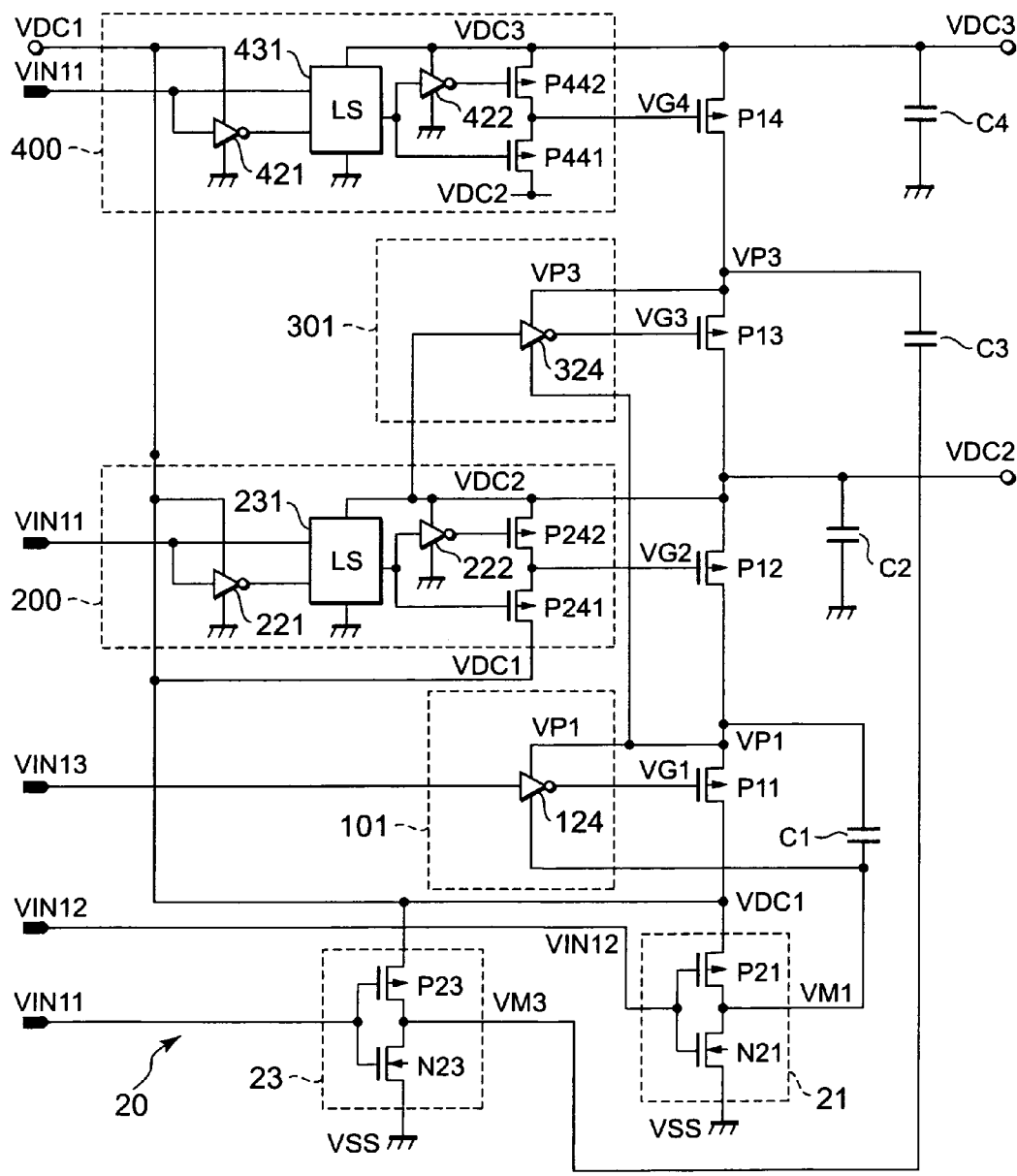
FIG. 11 is a diagram showing a configuration of the booster circuit according to the second exemplary embodiment of the present invention.

Next, a booster circuit according to a second exemplary embodiment of the present invention will be described. As shown in FIG. 10, a booster circuit 20 is supplied with boost clock signals VIN11 to VIN13 from a boost clock generation circuit 22, and generates a supply voltage VDC2 and a supply voltage VDC3, which are boosted to approximately twice and three times a supply voltage VDC1, respectively. FIG. 11 shows a configuration of the booster circuit 20. The same reference numerals will be given to the same components as those of the booster circuit 10 according to the first exemplary embodiment shown in FIG. 7, and detailed description thereof will be omitted. Here, for simplification of description, the following assumptions are made. Specifically, a supply voltage VSS as a reference voltage is 0 volt (ground voltage), and the supply voltage VDC1 is V volts (for example, 2.8 volts). Moreover, description will be given assuming that the booster circuit 20 ideally operates and that the supply voltage VDC2 is boosted to 2V volts (for example, 5.6 volts) and the supply voltage VDC3 is boosted to 3V volts (for example, 8.4 volts). Moreover, the transistors include a transistor having a breakdown voltage of approximately V (for example, 3 volts), a transistor having a breakdown voltage of approximately 2V (for example, 6 volts), and a transistor having a breakdown voltage of approximately 3V (for example, 9 volts), and these transistors will be referred to as a low breakdown voltage transistor, a middle breakdown voltage transistor, and a high breakdown voltage transistor, respectively.

As shown in FIG. 11, the booster circuit 20 includes P channel MOS transistors P11 to P14, capacitors C1 to C4, inverters 21 and 23, and gate controllers 101, 200, 301, and 400. Unlike the first exemplary embodiment, the gate controllers 101 and 301 replace the gate controllers 100 and 300, and the inverter 21 is driven by a boost clock signal VIN12 different from the boost clock signal VIN11 that drives the inverter 23.

The gate control circuit 101 includes an inverter 124 which is supplied with supply voltages VP1 and VM1. The inverter 124 receives input of the boost clock signal VIN13 and inverts and level-shifts the boost clock signal VIN13. The signal thus obtained (voltage VG1) is applied to the gate of the transistor P11.

The inverter 124 has the same configuration as other inverters, as shown in FIG. 3. The inverter 124 is supplied with a voltage VP1 at a connection node between the transistors P11 and P12 and with a voltage VM1 of an output node of the inverter 21, as the supply voltage VDD1 and as the supply voltage VDD0, respectively. An input signal of the inverter 124 is the boost clock signal VIN13 that changes between the supply voltage VDC1 and the supply voltage VSS. The middle breakdown voltage transistor needs to be used for the inverter 124.

The gate control circuit 301 includes an inverter 324 which is supplied with the supply voltages VP3 and VP1. The supply voltage VDC2 is connected to an input node of the inverter 324, and an output node thereof is connected to the gate of the transistor P13 (voltage VG3).

The inverter 324 has the same configuration as that of a regular inverter, as shown in FIG. 3. The inverter 324 is supplied with the voltage VP3 at a connection node between the transistors P13 and P14 and with the voltage VP1 at a connection node between the transistors P11 and P12, as the supply voltage VDD1 and as the supply voltage VDD0, respectively. The supply voltage VDC2 is inputted into an input node of the inverter 324 as an input signal. In the inverter 324, while the middle breakdown voltage transistor needs to be used for the N channel MOS transistor N20, the low breakdown voltage transistor can be used for the P channel MOS transistor.

Here, the first boost means includes the transistors P11 and P12, the inverter 21, and the capacitors C1 and C2. The second boost means includes the transistors P13 and P14, the inverter 23, and the capacitors C3 and C4.

The booster circuit 20 is supplied with the boost clock signals VIN11 to VIN13 and performs charge pump operation to obtain a boost voltage. The first boost means boosts the supply voltage VDC1 to generate the supply voltage VDC2, and the second boost means boosts the supply voltage VDC2 to generate the supply voltage VDC3.

Next, operation of the booster circuit 20 will be described with reference to FIGS. 12 and 13. FIGS. 12 and 13 each show a voltage waveform of each part in the steady state of the booster circuit 20. In the booster circuit 20, charge and discharge of the capacitors C1 and C3 are repeated by the switching operation of the transistors P11 to P14 and by the inversion operation of the inverters 21 and 23, and charge thereby moves from the capacitors C1 and C3 to the capacitors C2 and C4. The charge pump operation is thereby performed. As a result, charge is charged into the capacitor C2 from the drain (source) of the transistor P12. The voltage VDC2 of the capacitor C2 gradually rises, and reaches the voltage approximately twice the supply voltage VDC1 (2V volts) in the steady state. Moreover, charge is charged into the capacitor C4 from the drain (source) of the transistor P14, and the voltage VDC3 of the capacitor C4 gradually rises, and reaches the voltage approximately three times the supply voltage VDC1 (3V volts) in the steady state.

As shown in FIGS. 12A to 12C, the boost clock generation circuit 22 generates the boost clock signals VIN11 to VIN13 that change between V volts and 0 volt, and supplies the signals to the booster circuit 20. With the boost clock signal VIN12 shown in FIG. 12B as the reference, the boost clock signal VIN11 is, as shown in FIG. 12A, a signal whose rising timing is advanced by Δt1 from the boost clock signal VIN12 by Δt2 and whose falling timing is delayed by Δt2 from the boost clock signal VIN12. As shown in FIG. 12C, the boost clock signal VIN13 is a signal whose rising timing is delayed by Δt2 from the boost clock signal VIN12 and whose falling timing is advanced by Δt2 from the boost clock signal VIN12 by Δt2.

Time shown by Δt1 is adjusted to be not less than a rise/falling transition time of the voltage VP1 at the connection node between the transistors P11 and P12 and not less than a rise/falling transition time of the voltage VP3 at the connection node between the transistors P13 and P14. This time delay Δt1 may be a different time depending on the rise/falling transition time of the voltage VP1 and the rise/falling transition time of the voltage VP3.

The operation of the gate controllers 200 and 400 that receive input of the boost clock signal VIN11 is the same as the operation described in the first exemplary embodiment, and description thereof will be omitted.

In the gate controller 101, since the supply voltages VP1 and VM1 of the inverter 124 change in response to the boost clock signal VIN12 (FIG. 12I), the output signal of the inverter 124 also changes. The inverter 124 outputs the voltage VM1 when applied with a high-level signal at the input node thereof, and outputs the voltage VP1 when applied with a low-level signal at the input node thereof. The inverter 124 receives input of the boost clock signal VIN13; therefore, as shown in FIG. 12G the voltage VG1 outputted from the inverter 124 becomes 0 volt, which is equal to the voltage VM1, after the boost clock signal VIN11 rises and 2Δt2 passes. Since the gate voltage VG1 of the transistor P11 is the voltage VM1 (0 volt) at this time, the transistor P11 is turned on, and the capacitor C1 is charged by the supply voltage VDC1.

Subsequently, the boost clock signal VIN13 falls, and simultaneously, the output of the inverter 124 is inverted. Thereby, the voltage VG1 once becomes V volts equal to the voltage VP1. Then, the transistor P11 is turned off. Further, the voltage VG1 as well as the voltage VP1 becomes 2V volts in response to falling of the boost clock VIN12 after the passage of Δt2.

Here, the gate voltage VG1 of the transistor P11 is the maximum of 2V volts and the minimum of 0 volt. Moreover, the source voltage or drain voltage of the transistor P11 is V volts to 2V volts. FIG. 13F shows a waveform of the voltage (VG1-VP1), and FIG. 13H shows a waveform of the voltage (VG1-VDC1). As shown in these drawings, the maximum of the voltage between the gate and source (drain) of the transistor P11, i.e., the voltage (VG1-VP1) and the voltage (VG1-VDC1), is ±V volts (for example, ±2.8 volts).

(Gate Controller 301)

In the gate controller 301, the voltage VP3 supplied to the inverter 324 becomes the voltage equal to the voltage VDC2 (2V volts), as shown in FIG. 12H, after the boost clock VIN11 becomes the high level and Δt2 passes. At this time, the boost clock signal VIN2 becomes the high level, and the voltage VP1 supplied to the inverter 324 becomes V volts (voltage VDC1) from 2V volts, as shown in FIG. 12I. For that reason, the inverter 324, to which the voltage VDC2 is connected at the input node, and outputs the voltage VP1 (V volts) supplied as a low supply voltage as shown in FIG. 12E to apply the voltage VP1 to the gate of the transistor P13 (VG3). Thereby, the transistor P13 is turned on, and the capacitor C3 is charged up to the voltage VDC2.

On the other hand, as shown in FIG. 12I, when the boost clock signal VIN12 becomes the low level, the voltage VP1 becomes 2V volts. Since the voltage VDC2 (2V volts) is applied to the input node of the inverter 324, the inverter 324 outputs the voltage VP3 (3V volts) supplied as a high supply voltage as shown in FIG. 12E, and applies the voltage VP3 to the gate of the transistor P13. The transistor P13 is thereby turned off. Subsequently, the boost clock signal VIN11 becomes the low level, and the voltages VP3 and VM3 at the respective ends of the capacitor C3 rise as shown in FIG. 12H.

Here, the gate voltage VG3 of the transistor P13 is the maximum of 3V volts and the minimum of V volts. Moreover, the source (drain) voltage is 2V volts to 3V volts. As shown in FIGS. 13E and 13G, the maximum value of voltage between the gate and source (drain) is ±V volts (for example, ±2.8 volts). FIG. 13E shows a waveform of the voltage between the gate and drain (source) (VG3-VP3) of the transistor P13, and FIG. 13G shows the voltage between the gate and source (drain) (VG3-VDC2) of the transistor P13.

Therefore, the low breakdown voltage transistor having a breakdown voltage between the gate and source of approximately V volts (for example, 3 volts) can be used for the transistors P11 to P14 that perform the charge pump operation. The breakdown voltage may be approximately equal to the breakdown voltage of the transistor that supplies the input signal. Thus, compared with the booster circuit 10 according to the first exemplary embodiment, the booster circuit 20 according to the second exemplary embodiment can reduce circuits for gate voltage control, and can further reduce the substrate area.

Moreover, while description has been given on the exemplary embodiments in which the first and second boost means are used to obtain the doubled and tripled boost voltages here, a higher boost voltage can be obtained by further disposition of the same boost means.

As described above, according to the present invention, the transistor having a breakdown voltage between the gate and source approximately equal to that of the transistor that supplies the input signal can be used for the transistors P11 to P14 that perform the charge pump operation. Thereby, the substrate area of this booster circuit can be reduced while boosting and outputting a wider range of the input power voltage efficiently.

Further, it is noted that Applicant's intent is to encompass equivalents of all claim elements, even if amended later during prosecution.

What is claimed is:

1. A charge pump-type booster circuit, comprising a boost circuit including:
    first and second transistors connected in series between a first voltage and a second voltage;
    a first capacitor including one end connected to a connection node between the first transistor and the second transistor;
    a first drive circuit that boosts a voltage at an other end of the first capacitor;
    a second capacitor connected between the second voltage and a reference voltage;
    a first controller that controls a conductivity of the first transistor; and
    a second controller that receives the first and second voltages, and supplies one of the first voltage and the second voltage to the second transistor, to control a conductivity of the second transistor,
    wherein the boost circuit is supplied with the reference voltage, a supply voltage, and a boost clock signal, and generates the second voltage by boosting the supply voltage,
    wherein the boost clock signal includes a first clock signal supplied to the first drive circuit and the second controller, and a second clock signal supplied to the first controller, and
    wherein a falling timing of the first clock signal is delayed by a predetermined time from a rising timing of the second clock signal, and a falling timing of the second clock signal is delayed by the predetermined time from a rising timing of the first clock signal.

2. The booster circuit according to claim 1, wherein the second controller includes third and fourth transistors connected in series between the first voltage and the second voltage,
    wherein a connection node between the third transistor and the fourth transistor is connected to a gate of the second transistor, and
    wherein the conductivity of the second transistor is controlled between the first voltage and the second voltage.

3. The booster circuit according to claim 1, wherein the first controller comprises a second drive circuit that is supplied with a voltage at the connection node and a third voltage lower than the first voltage, that outputs a voltage between the voltage at the connection node and the third voltage, and that controls the conductivity of the first transistor.

4. The booster circuit according to claim 1, further comprising a plurality of the boost circuits, wherein among the plurality of boost circuits, a first boost circuit is supplied with the supply voltage as the first voltage of the first boost circuit, and generates the second voltage of the first boost circuit, and
    wherein among the plurality of boost circuits, an n-th boost circuit (n is a natural number) is supplied with the second voltage of an (n−1)-th boost circuit as the first voltage of the n-th boost circuit, and generates the second voltage of the n-th boost circuit.

5. The booster circuit according to claim 3, further comprising a plurality of the boost circuit, wherein among the plurality of boost circuits, a first boost circuit is supplied with the supply voltage as the first voltage of the first boost circuit and with the reference voltage as the third voltage of the first boost circuit, and generates the second voltage of the first boost circuit, and wherein among the plurality of boost circuits, an n-th boost circuit is supplied with the second voltage of an (n−1)-th boost circuit as the first voltage of the n-th boost circuit and with the first voltage of the (n−1)-th boost circuit as the third voltage of the n-th boost circuit, and generates the second voltage of the n-th boost circuit.

6. The booster circuit according to claim 1, further comprising a plurality of the boost circuits, wherein among the plurality of boost circuits, a first boost circuit includes a third drive circuit in the first controller of the first boost circuit, the third drive circuit being supplied with a voltage at a connection node of the first boost circuit and an output voltage of the first drive circuit of the first boost circuit, and controlling a conductivity of the first transistor of the first boost circuit, wherein the first boost circuit is supplied with the supply voltage as the first voltage of the first boost circuit, and generates the second voltage of the first boost circuit, wherein among the plurality of boost circuits, an n-th boost circuit includes a fourth drive circuit in the first controller of the n-th boost circuit, the fourth drive circuit being supplied with a voltage at a connection node of the n-th boost circuit and a voltage at the connection node of an (n−1)-th boost circuit, and controlling a conductivity of the first transistor of the n-th boost circuit, and wherein the n-th boost circuit is supplied with the second voltage of the (n−1)-th boost circuit as the first voltage of the n-th boost circuit, and generates the second voltage of the n-th boost circuit.

7. The booster circuit according to claim 6, wherein the first clock signal is supplied to a second drive circuit, and the second clock signal is supplied to the first drive circuit, and a third clock signal supplied to the third drive circuit, wherein the rising timing of the first clock signal is advanced by a predetermined time from the rising timing of the second clock signal, while the falling timing of the first clock signal is delayed by the predetermined time from the falling timing of the second clock signal, and wherein a rising timing of the third clock signal is delayed by the predetermined time from the rising timing of the second clock signal, while a falling timing of the third clock signal is advanced by the predetermined time from the falling timing of the second clock signal.

8. The booster circuit according to claim 1, wherein the first clock signal is supplied to a second drive circuit, and the second clock signal is supplied to the first drive circuit, and wherein a rising timing of the first clock signal is advanced by a predetermined time from the rising timing of the second clock signal, while the falling timing of the first clock signal is delayed by the predetermined time from the falling timing of the second clock signal.

9. A semiconductor device, comprising: the booster circuit according to claim 1; and a boost clock generation circuit that generates the boost clock signal.

10. A voltage booster circuit, comprising:

a first transistor coupled between a first node and a second node;

a second transistor coupled between the second node and a third node;

a capacitor including a first end coupled to the second node;

a first driver which supplies a first voltage to a second end of the capacitor in response to a first clock signal;

a first controller which controls a conductivity of the first transistor; and a second controller comprising:

a level shifter which is responsive to the first clock signal to produce a shifted clock signal; and a first inverter which includes at least third and fourth transistors connected in series between the first node and the third node, and which is in response to the shifted clock signal to control a conductivity of the second transistor, wherein the first controller includes:

a second level shifter which is responsive to a second clock signal to produce a second shifted clock signal;

a second inverter which is connected between the third node and a reference node and which is in response to the shifted clock signal to produce an inverted signal; and a third inverter which is connected between the second node and a second reference node supplied with the first voltage and which is in response to the inverted signal to drive a gate electrode of the first transistor.

\* \* \* \* \*